(12) United States Patent
Calabro et al.

(10) Patent No.: US 9,333,484 B2
(45) Date of Patent: May 10, 2016

(54) REVERSIBLE $CO_2$ FIXATION VIA SELF-ASSEMBLED SILOXANES

(71) Applicants: David C. Calabro, Bridgewater, NJ (US); Quanchang Li, Dayton, NJ (US); Dennis G. Peiffer, Annandale, NJ (US); Mobae Afeworki, Phillipsburg, NJ (US); Stephen M. Cundy, Lebanon (GB); Charanjit S. Paur, Phillipsburg, NJ (US); Peter I. Ravikovitch, Princeton, NJ (US)

(72) Inventors: David C. Calabro, Bridgewater, NJ (US); Quanchang Li, Dayton, NJ (US); Dennis G. Peiffer, Annandale, NJ (US); Mobae Afeworki, Phillipsburg, NJ (US); Stephen M. Cundy, Lebanon (GB); Charanjit S. Paur, Phillipsburg, NJ (US); Peter I. Ravikovitch, Princeton, NJ (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 389 days.

(21) Appl. No.: 14/089,055

(22) Filed: Nov. 25, 2013

(65) Prior Publication Data

US 2014/0186246 A1   Jul. 3, 2014

Related U.S. Application Data

(60) Provisional application No. 61/745,879, filed on Dec. 26, 2012.

(51) Int. Cl.
| | |
|---|---|
| *B01D 53/14* | (2006.01) |
| *B01J 20/30* | (2006.01) |
| *B01D 53/62* | (2006.01) |
| *B01J 20/26* | (2006.01) |
| *C08G 77/26* | (2006.01) |

(Continued)

(52) U.S. Cl.
CPC ............ *B01J 20/3085* (2013.01); *B01D 53/62* (2013.01); *B01J 20/262* (2013.01); *B01J 20/264* (2013.01); *B01J 20/267* (2013.01); *B01J 20/3064* (2013.01); *B01J 20/3078* (2013.01); *C08G 77/26* (2013.01); *C08L 83/08* (2013.01); *B01D 53/02* (2013.01); *B01D 2253/202* (2013.01); *B01D 2257/504* (2013.01); *Y02C 10/04* (2013.01); *Y02C 10/06* (2013.01); *Y02C 10/08* (2013.01); *Y02P 20/152* (2015.11)

(58) Field of Classification Search
None
See application file for complete search history.

(56) References Cited

U.S. PATENT DOCUMENTS

| | | | |
|---|---|---|---|
| 4,857,582 | A | 8/1989 | Wolfgruber et al. |
| 6,120,587 | A | 9/2000 | Elfersy et al. |

(Continued)

FOREIGN PATENT DOCUMENTS

| | | | |
|---|---|---|---|
| JP | 2011099070 A | * | 5/2011 |
| WO | 9742200 A1 | | 11/1997 |

OTHER PUBLICATIONS

JP2011099070A (May 2011) English Translation.*

(Continued)

*Primary Examiner* — Jonathan Johnson
*Assistant Examiner* — Anita Nassiri Motlagh
(74) *Attorney, Agent, or Firm* — David M. Weisberg; Andrew T. Ward

(57) ABSTRACT

Methods are provided for synthesizing novel types of self-assembled siloxanes, such as polysiloxanes, with a sufficiently high density of amine functional groups to be useful for $CO_2$ capture and release processes. Additionally, it has been unexpectedly found that some self-assembled polysiloxanes can be used for high temperature adsorption of $CO_2$.

19 Claims, 10 Drawing Sheets

(51) Int. Cl.
  *C08L 83/08* (2006.01)
  *B01D 53/02* (2006.01)

(56) References Cited

U.S. PATENT DOCUMENTS 7,452,845 B2  11/2008  Brandes et al.
2011/0179948 A1  7/2011  Chance et al.

OTHER PUBLICATIONS

Sartori et al, "Sterically hindered amines for carbon dioxide removal from gases", Industrial & Engineering Chemistry Fundamentals, May 1983, vol. 22, No. 2, pp. 239-249, ACS Publications, American Chemical Society.

Xu et al, "Novel Polyethylenimine-Modified Mesoporous Molecular Siev of MCM-41 Type as High-Capacity Adsorbent for CO2 Capture", Energy and Fuels, Oct. 12, 2002, vol. 16, No. 6, pp. 1463-1469, ACS Publications, American Chemical Society.

Alauzun et al, "CO2 as a Supramolecular Assembly Agent: A Route for Lamellar Materials with a High Content of Amine Groups," Journal of American Chemical Society, Jul. 23, 2005, vol. 127, No. 32, pp. 11204-11205, ACS Publications, American Chemical Society.

Gray et al, "Improved immobilized carbon dioxide capture sorbents", Fuel Processing Technology, Oct. 2005, vol. 86, issues 14-15, pp. 1449-1455, Science Direct, Elsevier.

Harlick et al, "Applications of Pore-Expanded Mesoporous Silicas. 3. Triamine Silane Grafting for Enhanced CO2 Adsorption", Industrial & Engineering Chemistry Research, Mar. 22, 2006, vol. 45, No. 9, pp. 3248-3255, ACS Publications, American Chemical Society.

Yue et al, "CO2 capture by as-prepared SBA-15 with an occluded organic template," Advanced Functional Materials, Jul. 25, 2006, vol. 16, iss. 13, pp. 1717-1722, Wiley Online.

Hoffmann et al, "Control of morphology inside the mesoporous gelstructure in silica-gels", Colloids and Surfaces A (Physiochemical and Engineering Aspects), Dec. 15, 2006, vol. 291, No. 1-3, pp. 117-127, ScienceDirect, Elsevier.

Kai et al, "New approach for the preparation of nanoporous polyorganosilicate low-k films," Journal of Applied Polymer Science, Jan. 15, 2007, vol. 103, issue 2, pp. 1238-1243, Wiley InterScience, Wiley Periodicals, Inc.

Jadhav et al, "Monoethanol Amine Modified Zeolite 13X for CO2 Adsorption at Different Temperatures", Energy and Fuels, Sep. 28, 2007, vol. 21, No. 6, pp. 3555-3559, ACS Publications, American Chemical Society.

"Harlick et al, ""Applications of Pore-Expanded Mesoporous Silica. 5. Triamine Grafted Materialwith Exceptional CO2 Dynamic and Equilibrium Adsorption Performance""", Industrial & Engineering Chemistry Research, Dec. 20, 2007, vol. 46, No. , pp. 446-458, ACS Publications, American Chemical Society".

Alauzun et al, "Reversible Covalent Chemistry of CO2: An Opportunity for Nano-Structured Hybrid Organic-Inorganic Materials", Chemistry of Materials, 2008, vol. 20, No. 2, pp. 503-513, ACS Publications, American Chemical Society.

Yue et al, "Efficient CO2 Capturer Derived from As-Synthesized MCM-41 Modified with Amine", Chemistry: A European Journal, Feb. 18, 2008, vol. 14, issue 11, 3442-3451, Wiley InterScience, Wiley Online Library.

Sae-Ung et al, "Amine-functionalized mesoporous materials for formaldehyde adsorption", Paper at 8th World Congress of Chemical Engineering, 2009, p. 524b.

Tang et al, "CO2—Sorption Properties of Organosilicas with Bridging Amine Functionalities Inside the Framework", Journal of Physical Chemistry C, Jan. 27, 2010, vol. 114, No. 6, pp. 2494-2498, ACS Publications, American Chemical Society.

Langeroudi et al, "Grafted amine/CO2 interactions in (gas-)liquid-solid adsorption/absorption equilibria", Journal of Physical Chemistry C, Dec. 31, 2010, vol. 113, No. 52, pp. 21866-21876, ACS Publications, American Chemical Society, Elsevier Inc.

Mohammed et al, "Dynamic surface properties of amino-terminated self-assembled monolayers incorporating reversible CO2 chemistry," Industrial & Engineering Chemistry Research, Jul. 6, 2011, vol. 50, No. 13, pp. 8034-8041, ACS Publications, American Chemical Society.

Bougie et al, "Sterically Hindered Amine-Based Absorbents for the Removal of CO2 from Gas Streams," Journal of Chemical & Engineering Data, Feb. 14, 2012, vol. 57, p. 635-669, ACS Publications, American Chemical Society.

* cited by examiner

REVERSIBLE CO₂ FIXATION VIA SELF-ASSEMBLED SILOXANES

CROSS-REFERENCE TO RELATED APPLICATIONS

This application claims the benefit of U.S. application Ser. No. 61/745,879, filed on Dec. 26, 2012; which is incorporated by reference herein in its entirety.

FIELD OF THE INVENTION

This disclosure generally relates to a solid sorbent and the selective removal of $CO_2$ and/or other acid gases from a gaseous stream containing one or more of these gases using such a sorbent.

BACKGROUND OF THE INVENTION

The removal of carbon dioxide from mixed gas streams is of great industrial importance and commercial value. Carbon dioxide is a ubiquitous and inescapable by-product of the combustion of hydrocarbons and there is growing concern over its accumulation in the atmosphere and its potential role in global climate change. While existing methods of $CO_2$ capture have been satisfactory for the scale in which they have so far been used, future uses on the far larger scale required for significant reductions in atmospheric $CO_2$ emissions from major stationary combustion sources, such as power stations fired by fossil fuels, makes it necessary to improve the energy efficiency of the processes used for the removal of $CO_2$ from gas mixtures and thereby lower the cost of $CO_2$ capture. According to data developed by the Intergovernmental Panel on Climate Change, power generation produces approximately 78% of stationary source emissions of $CO_2$ with other industries such as cement production (7%), refineries (6%), iron and steel manufacture (5%), petrochemicals (3%), oil and gas processing (0.4%), and the biomass industry (bioethanol and bioenergy) (1%) making up the bulk of the total, illustrating the very large differences in scale between power generation on the one hand and all other uses on the other. To this must be added the individual problem of the sheer volumes of gas which will need to be treated. Flue gases generally consist mainly of nitrogen from combustion air, with the $CO_2$, nitrogen oxides, and other emissions such as sulfur oxides making up relatively smaller proportions of the gases which require treatment. Typically, the wet flue gases from fossil fuel power stations can contain about 7-15 vol % of $CO_2$, depending on the fuel, with natural gas giving the lowest amounts and hard coals the highest.

A variety of current efforts are underway to develop efficient, low cost technology for the capture and sequestration of carbon dioxide and other acid gases from dilute, low pressure gas streams. Conventionally, the separation of $CO_2$ from dilute gas streams is done commercially by aqueous amine scrubbing systems. This technology is challenged for large scale implementation due to the high energy requirements of heating and cooling large volumes of water, and also by the corrosive salts that form as a product of the amine/$CO_2$ chemistry. The latter factor coupled with solubility limits, creates a limit in $CO_2$ capture efficiency of about 2 moles $CO_2$/kg sorbent. Solid amine sorbents have greatly reduced energy requirements, little to no corrosivity problems, and uptake capacities in excess of 2 moles $CO_2$/kg sorbent.

The literature on solid amine sorbents for $CO_2$ capture is largely divided into supported amines based on the grafting or impregnation of various amine types either on the surface or in the pore volume of solid supports, or the polymerization of amine-containing monomers into amine-rich polymers or copolymers. The most likely process options for employing these solid sorbents in gas separation include pressure-swing adsorption, temperature-swing adsorption, or a combination of the two. In all of these cases, the rate of gas diffusion in and out of the sorbent particles is a critical factor in determining process economics. Slow diffusion rates translate into longer sorption/desorption cycle times and larger sorbent bed sizes. Both of these factors increase processing cost for a given gas feed rate.

Whereas the above solid amine sorbents have achieved acceptably high levels of $CO_2$ sorption capacity, there is a general recognition that insufficient gas diffusion rates in these materials is a major limitation to their commercial utilization. Hence, a strong need exists for a sorbent design that imparts increased gas diffusion rates while maintaining high $CO_2$ sorption capacity and cycle stability and at low cost.

U.S. Pat. No. 4,857,582 describes a process for preparing colloidal suspensions of polysiloxanes. The process includes introducing alkoxysilanes into an aqueous solution, along with an emulsifier, to form polysiloxanes. The alkoxysilanes can optionally include an aminoalkyl group, such as an N-(2-aminoethyl)-3-aminopropyl group. The process does not involve introduction of $CO_2$.

A paper presented by Sae-Ung et al. as part of the $8^{th}$ World Congress of Chemical Engineering described formation of a mesoporous material based on co-condensation of tetraethoxysilane and N-(2-aminoethyl)-3-aminopropyl triethoxysilane. Pores were formed in the mesoporous material by using a surfactant template as part of the condensation reaction and then extracting the template. During formation of the mesoporous material, $CO_2$ was not introduced into the reaction mixture.

An article by Alauzun et al. that can be found at Chem. Mater., Vol. 20, pg 503 (2008) describes formation of amine-functionalized organosilicas. $CO_2$ is introduced into the reaction mixture prior to triggering a condensation reaction. Due to carbamates formed from interaction of the $CO_2$ with the amine-functionalized organosilicas, the reaction results in formation of a condensation product with at least some long range order.

SUMMARY OF THE INVENTION

One aspect of the invention relates to a polysiloxane composition comprising one or more crosslinking monomers and one or more non-crosslinking monomers, a molar ratio of crosslinking monomers to non-crosslinking monomers being about 5:1 or less, the crosslinking monomers having the structure —(—O—Si($R_3$,$R_4$)—)—, where $R_3$ is an aminoalkyl moiety comprising one or more amine groups and 12 carbon atoms or less, and where $R_4$ is an oxyalkyl moiety having 1 to 8 carbons or a silyl ether crosslink to another siloxane monomer, and the non-crosslinking monomers having the structure —(—O—Si($R_1$,$R_2$)—)—, where $R_1$ is a $C_1$-$C_4$ alkyl moiety, and where $R_2$ is independently a $C_1$-$C_4$ alkyl moiety or an aminoalkyl moiety comprising one or more amine groups and up to 12 carbon atoms, wherein, in at least a portion of the non-crosslinking monomers, $R_2$ is an aminoalkyl moiety comprising one or more amine groups and up to 12 carbon atoms.

Another aspect of the invention relates to a polysiloxane composition comprising one or more crosslinking monomers, one or more non-crosslinking monomers, and a pore-forming compound, a molar ratio of crosslinking monomers to non-crosslinking monomers being about 5:1 or less and a molar ratio of crosslinking monomers to pore-forming compound optionally being less than about 3:1, the crosslinking monomers having the structure —(—O—Si($R_3$,$R_4$)—)—, where $R_3$ is an aminoalkyl moiety comprising one to three amine groups and 12 carbon atoms or less, and where $R_4$ is an oxyalkyl moiety having 1 to 8 carbons or a silyl ether crosslink to another siloxane monomer, and the non-crosslinking monomers having the structure —(—O—Si($R_1$,$R_2$)—)—, where $R_3$ is a $C_1$-$C_4$ alkyl moiety, and where $R_2$ is independently a $C_1$-$C_4$ alkyl moiety or an aminoalkyl moiety comprising one to three amine groups and up to 12 carbon atoms, wherein the pore-forming compound comprises a diaminoalkyl compound, and wherein, in at least a portion of the non-crosslinking monomers, $R_2$ is a $C_1$-$C_4$ alkyl moiety.

Still another aspect of the invention relates to a $CO_2$-sorbent polysiloxane composition comprising one or more crosslinking monomers and one or more non-crosslinking monomers, a molar ratio of crosslinking monomers to non-crosslinking monomers being about 5:1 or less, the crosslinking monomers having the structure —(—O—Si($R_3$,$R_4$)—)—, where $R_3$ is an aminoalkyl moiety comprising one or more amine groups and 12 carbon atoms or less, and where $R_4$ is an oxyalkyl moiety having 1 to 8 carbons or a silyl ether crosslink to another siloxane monomer, and the non-crosslinking monomers having the structure —(—O—Si($R_1$,$R_2$)—)—, where $R_1$ is a $C_1$-$C_4$ alkyl moiety, and where $R_2$ is independently a $C_1$-$C_4$ alkyl moiety or an aminoalkyl moiety comprising one to three amine groups and up to 12 carbon atoms, wherein, in at least a portion of the non-crosslinking monomers, $R_2$ is a $C_1$-$C_4$ alkyl moiety, and wherein the polysiloxane composition has a $CO_2$ sorption capacity of at least about 0.5 mmol of $CO_2$, e.g., at least about 1.5 mmol of $CO_2$, per gram polysiloxane composition at a temperature of about 50° C. or less and at a $CO_2$ partial pressure of at least about 50 kPa.

Yet another aspect of the invention relates to a polysiloxane composition comprising one or more crosslinking monomers and one or more non-crosslinking monomers, a molar ratio of crosslinking monomers to non-crosslinking monomers being about 5:1 or less, the crosslinking monomers having the structure —(—O—Si($R_3$,$R_4$)—)—, where $R_3$ is an aminoalkyl moiety comprising one to three amine groups and up to 12 carbon atoms and which is connected to a silicon atom of a siloxane monomer having either two or three $C_1$-$C_8$ alkoxy groups attached thereto, and where $R_4$ is a $C_1$-$C_4$ alkyl moiety, an oxyalkyl moiety having 1 to 8 carbons, including cyclic, unsaturated, saturated, or aromatic groups, or a silyl ether crosslink to another siloxane monomer, and the non-crosslinking monomers having the structure —(—O—Si($R_1$,$R_2$)—)—, where $R_1$ is a $C_1$-$C_4$ alkyl moiety, and where $R_2$ is independently a $C_1$-$C_4$ alkyl or an aminoalkyl moiety comprising one to three amine groups and up to 12 carbon atoms, wherein the aminoalkyl moiety of $R_3$ optionally has the formula —$CH_2(CH_2)_x$NH$CH_2(CH_2)_y$$CH_2$NH$CH_2(CH_2)_z$—, where x is from 0 to 7, y is from 0 to 6, and z is from 0 to 7.

A further aspect of the invention relates to a polysiloxane composition comprising one or more non-crosslinking monomers, a pore-forming compound, and substantially no crosslinking monomers, a molar ratio of non-crosslinking monomers to pore-forming compounds being from about 1:9 to about 19:1, the pore-forming compound comprising a diaminoalkyl compound and/or a diamine-aromatic compound, and the non-crosslinking monomers having the structure —(—O—Si($R_1$,$R_2$)—)—, where $R_1$ is a $C_1$-$C_4$ alkyl moiety, and where $R_2$ is independently a $C_1$-$C_4$ alkyl moiety or an aminoalkyl moiety comprising one to three amine groups and up to 12, carbon atoms, wherein, in at least a portion of the non-crosslinking monomers, $R_2$ an aminoalkyl moiety comprising one or more amine groups and up to 12 carbon atoms.

Still a further aspect of the invention relates to a method of making a polysiloxane composition comprising: forming a solution comprising one or more non-crosslinking reagents, optionally one or more crosslinking reagents, and optionally a pore-forming compound, a ratio of crosslinking reagents to non-crosslinking reagents being about 5:1 or less, the crosslinking reagents, when present, having the structure

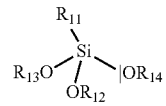

where $R_{11}$ is an aminoalkyl moiety comprising one to three amine groups and up to 12 carbon atoms, and each of $R_{12}$, $R_{13}$, and $R_{14}$ is independently an alkyl moiety having 1 to 8 carbons, the non-crosslinking reagents having the structure

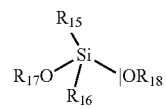

where $R_{15}$ is a $C_1$-$C_4$ alkyl moiety, $R_{16}$ is a $C_1$-$C_4$ alkyl moiety or an aminoalkyl moiety comprising one to three amine groups and up to 12 carbon atoms, and each of $R_{17}$ and $R_{18}$ is independently an alkyl moiety having 1 to 8 carbons, and the pore-forming compound, when present, comprising a diaminoalkyl compound and/or a diamino-aromatic compound, optionally comprising at least one ring; exposing the solution to a $CO_2$-containing gas stream under conditions sufficient for at least a portion of the amine groups to sorb $CO_2$ and thus form carbamates; adding water to the solution, the solution having a pH of 6 or less after addition of the water; and aging the solution to form a self-assembled and polymerized siloxane composition, the self-assembled and polymerized siloxane composition comprising a ratio of crosslinking monomers to non-crosslinking monomers of about 5:1 or less, wherein one or both of the following are satisfied: in at least a portion of the non-crosslinking reagents, $R_{16}$ is an aminoalkyl comprising one to three amine groups and up to 12 carbon atoms; and in at least a portion of the non-crosslinking reagents, $R_{16}$ is a $C_1$-$C_4$ alkyl moiety.

Yet a further aspect of the invention relates to a method for sorbing $CO_2$, comprising: exposing a $CO_2$-containing stream comprising a self-assembled amine-functionalized polysiloxane sorbent; sorbing at least about 1.5 mmol of $CO_2$ per gram of sorbent; and desorbing at least about 80% of the sorbed $CO_2$ at a temperature that differs from the exposure temperature by about 10° C. or less, at a pressure that is about 0-10% less than a pressure during the exposing, or a combination thereof.

Additionally or alternatively, one or more of the compositions described in the aspects of the invention herein/above can be made according to one or more of the methods described in the aspects of the invention herein/above.

BRIEF DESCRIPTION OF THE DRAWINGS

FIG. 11b shows the relatively low pressure end of the isotherm shown in FIG. 11a.

DETAILED DESCRIPTION OF THE EMBODIMENTS

Overview

In various aspects, methods are provided for synthesizing novel types of self-assembled siloxanes, such as polysiloxanes, with a sufficiently high density of amine functional groups to be useful for $CO_2$ capture and release processes. Additionally, it has been unexpectedly found that some self-assembled polysiloxanes can be used for relatively high temperature adsorption of $CO_2$.

Formation of Dense Network Self-Assembled Polysiloxane

Figure 1:
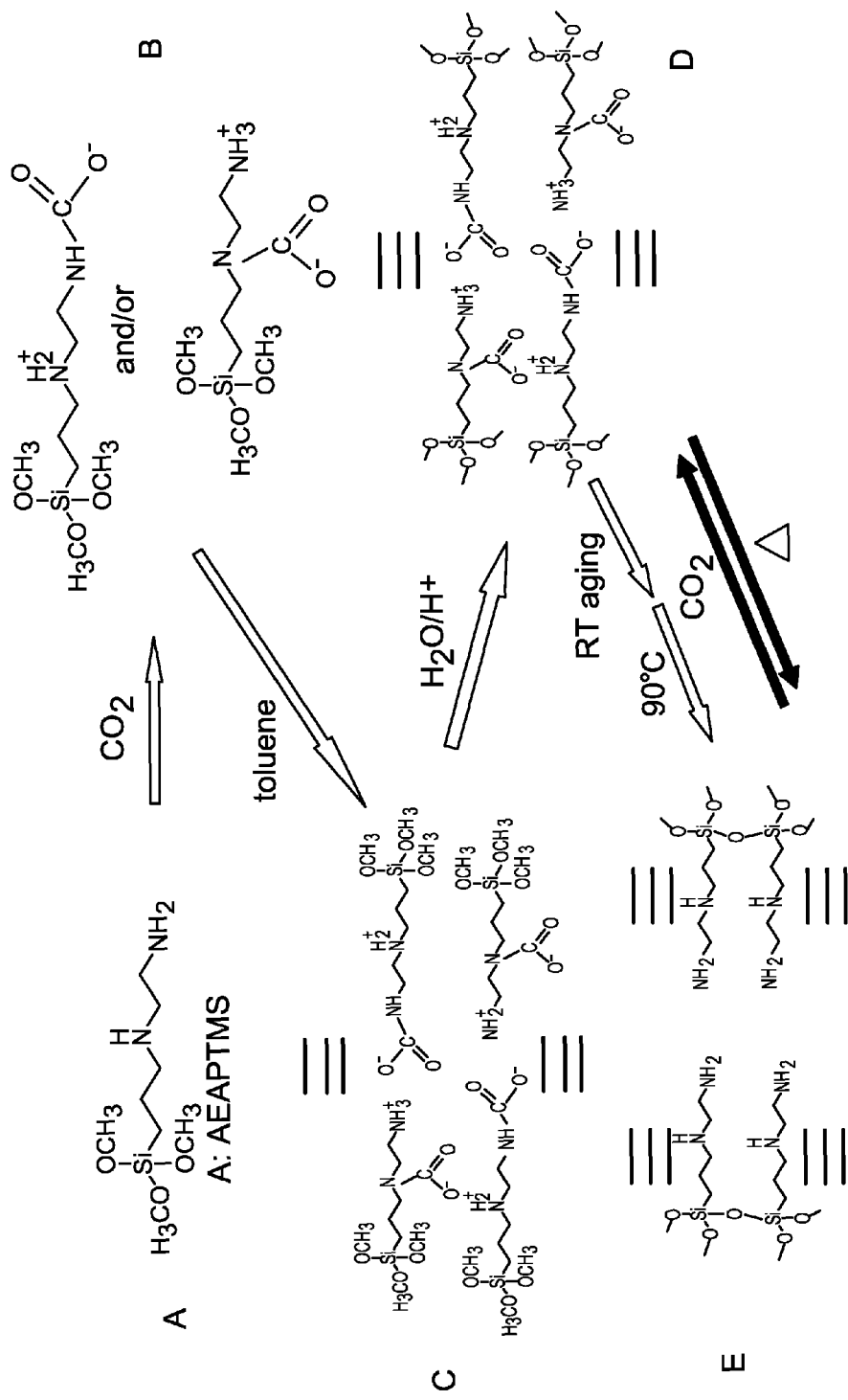
FIG. 1 schematically shows a reaction sequence for forming self-assembled siloxanes.

FIG. 1 shows an example of a process scheme for forming a self-assembled polysiloxane with a high amine density. In part A of general process scheme, an initial working solution can be formed by dissolving an aminoalkyltrialkoxysilane in toluene. In FIG. 1, the aminoalkyltrialkoxysilane is shown as N-(2-aminoethyl)-3-aminopropyltrimethoxysilane. In some embodiments, the scheme shown in FIG. 1 can be modified to allow for use of a variety of other aminoalkyltrialkoxysilanes can alternatively be used, so long as the compound has one or more amino groups in the alkyl side chain, e.g., at least two amino groups or at least three amino groups. For example, the "ethyl" and/or the "propyl" moieties in FIG. 1 can optionally be replaced by shorter or longer alkyl moieties, with some preference for alkyl moieties containing 8 carbons or less, e.g., from 1-6 carbons or from 2-6 carbons. Similarly, the methoxy groups in the aminoalkyltrimethoxysilane in FIG. 1 can be replaced by longer alkoxy moieties, with some preference for alkoxy moieties containing 8 carbons or less, e.g., from 1-6 carbons. Toluene can be selected as a non-polar solvent, but other non-polar solvents and/or solvent mixtures could alternatively be selected. Optionally, if the selected aminoalkyltrialkoxysilane is a liquid at a desired working temperature (such as room temperature), a solvent may not be needed. The non-polar solvent optionally but preferably does not contain any separately added water, and in some embodiments can be anhydrous.

The solution of N-(2-aminoethyl)-3-aminopropyltrimethoxysilane can then be exposed to $CO_2$, such as by bubbling $CO_2$ through the solution while stirring the solution for an hour (or another convenient amount of time). This can result in some temporary increase in temperature. The rise in temperature can be due to exothermic reactions from sorption of $CO_2$ by amino group(s) on the aminoalkyltrialkoxysilane molecule to form carbamate(s), as shown in B. This reaction can convert the neutral starting aminosiloxane into a charged carbamate salt possessing pairs of positive and negative charges, as shown in B. The generation of this relatively high density of charged species can provide a driving force for ordered stacking, as shown in C, whereby the molecules can orient, e.g., so as to maximize and minimize attractive and repulsive charge interactions, respectively. At this stage, the solution can typically become cloudy, e.g., due to phase separation of the polar network in the non-polar solvent. If water (and in particular water at a pH of less than 7) is present at stage C, the aminoalkyltrialkoxysilanes may start a condensation reaction before the alignment of the carbamate(s) occur(s). This can inhibit or prevent the desired self-assembled siloxane structure from being formed.

After the addition of $CO_2$ with stirring, water (and optionally an acid, to generate an acidic pH) can be introduced to C in a molar amount sufficient to react with the moles of alkoxy groups in crosslinking and non-crosslinking reagents (monomers) in the solution. This can initiate a hydrolysis/condensation reaction well-known to those skilled in the art, which can initially convert, the alkoxy groups in the solution into hydroxyl groups, as shown in D. After another period of aging (e.g., at room temperature), condensation of the hydroxysilyl groups can occur to form silyl ethers and eventually polysiloxane backbones that can "lock in" the rough alignment/orientation provided by the association of the carbamates. Though the reaction has been described herein as a hydrolysis step followed by a condensation step, it is possible for the steps not to be discretized, e.g., such that the formation of a few hydroxylsilyl groups can catalyze transetherification reactions from the alkoxysilyl moiety to a silyl ether crosslink. In any event, the resulting self-assembled polysiloxane structure can then be heated to a higher temperature, such as about 90° C., to decompose the carbamates (thus, releasing the previously sorbed $CO_2$). This can regenerate the original neutral amine functionalities in the aminoalkyl portion of the molecules, now having been coupled into a hybrid organic-inorganic network structure via three silyl ether (Si—O—Si) linkages on each Si atom, two forming a siloxane polymer backbone and the third forming an inter-backbone crosslink, as shown in E.

Based on the scheme in FIG. 1, the initial reaction of $CO_2$ with a propylamine-ethylamine functionalized trimethoxysilane can result in formation of carbamate salts at the amine sites at a mole ratio of approximately one $CO_2$ per diamine pair. The initial neutral aminosiloxane can be converted into an ion pair which, in a hydrophobic solvent, can self-assemble into a charge-balanced lamellar structure. The self-assembled lamellae can then be reacted, e.g., with acidic water, to bring about hydrolysis of the methoxy groups to form silicon hydroxyls, which can subsequently condense into extended silicon oxide layers. During these transformations, the relatively high charge density generated in the first step can serve to maintain the siloxane moieties in a tightly packed lamellar arrangement, resulting in a "layered silica" (or crosslinked polysiloxane) upon hydrolysis and condensation. The $CO_2$-induced self-assembly shown in FIG. 1 can produce a multi-layered lamellar structure having a relatively high density of diamine moieties, as shown in FIG. 4.

For the scheme similar to that shown in FIG. 1, the concentration of the aminoalkyltrialkoxysilane in a non-polar solution can be from about 0.05 M to about 0.5 M. The rate of $CO_2$ bubbling can be any convenient rate. The temperature of the solution during $CO_2$ contact can be any effective temperature but can optionally be about room temperature (~20-25° C.), or more generally from about 10° C. to about 75° C. The additional water can be added in a relatively small amount and can advantageously be added at a slow rate relative to the volume of the solution. For example, for lab scale synthesis with a volume less than 1 L, the water can be added dropwise. The water can preferably be acidic, such as water including HCl (or another strong acid) so that the pH of the added water can be about 3 or less. The aging of the solution after water addition can correspond to aging from about 2-5 days. The aged solution containing self-assembled siloxanes can then be heated to a temperature of about 80° C. or more, such as about 90° C. or more, to drive off the sorbed $CO_2$.

Figure 4:
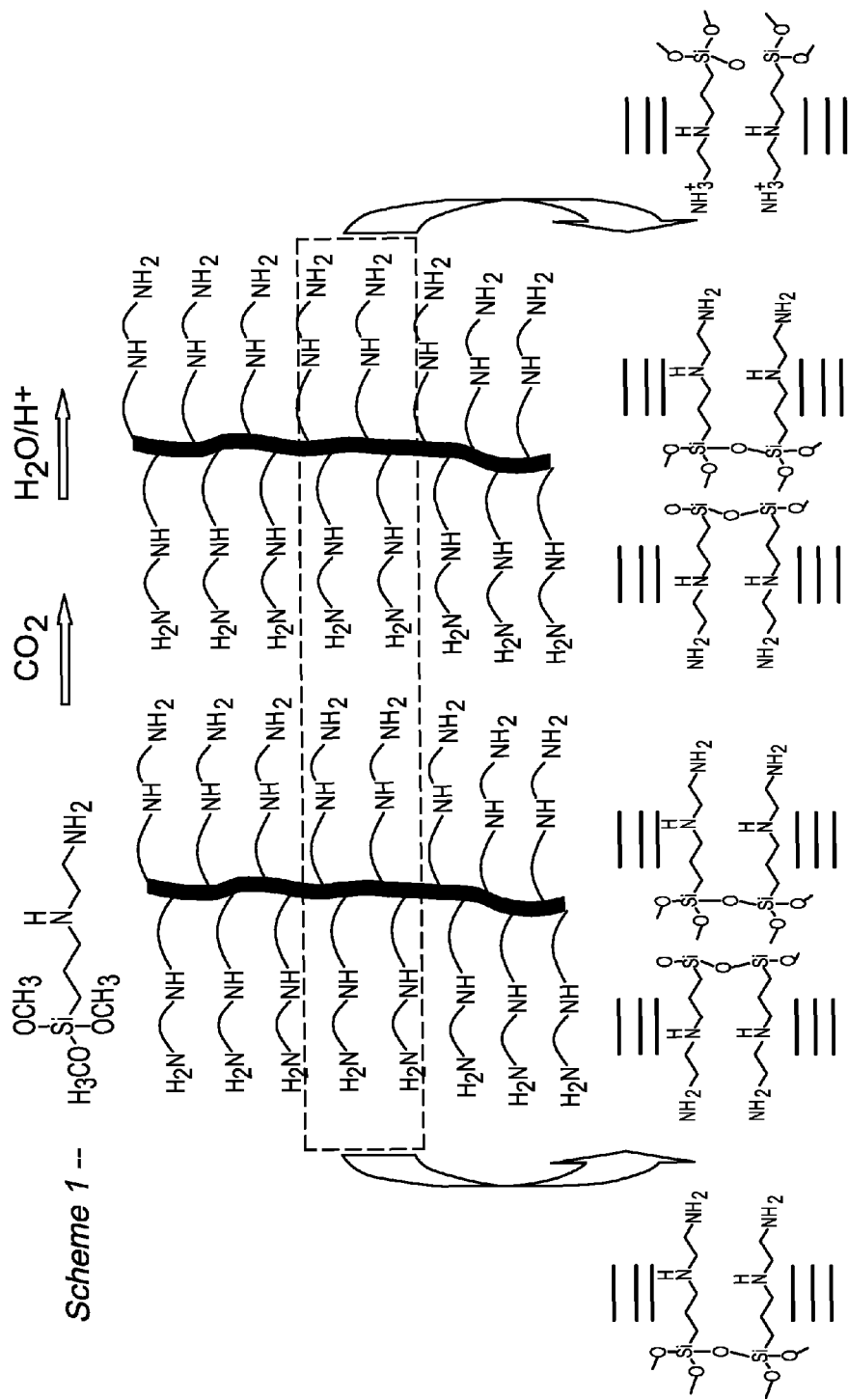
FIG. 4 schematically illustrates a lamellar structure of a self-assembled siloxane formed according to a sequence similar to FIG. 1.

FIG. 4 shows an example of the non-porous, tightly packed nature of the lamellar (polysiloxane) solids produced by methods similar to FIG. 1. As stated above, when $CO_2$ is sorbed by the amines to form carbamates, this can drive the alignment of the charged aminotrialkoxysiloxanes into an extended layered structure. Subsequent hydrolysis/condensation of the alkoxy groups can generate a three dimensional crosslinked silyl ether (functionalized layered silica) network. Thus, the method shown in FIG. 1 according to the prior art can generate a highly crosslinked, non-porous 3D network structure, as shown in FIG. 4.

Properties of Non-Porous Lamellar Siloxane Structures

Figure 2:
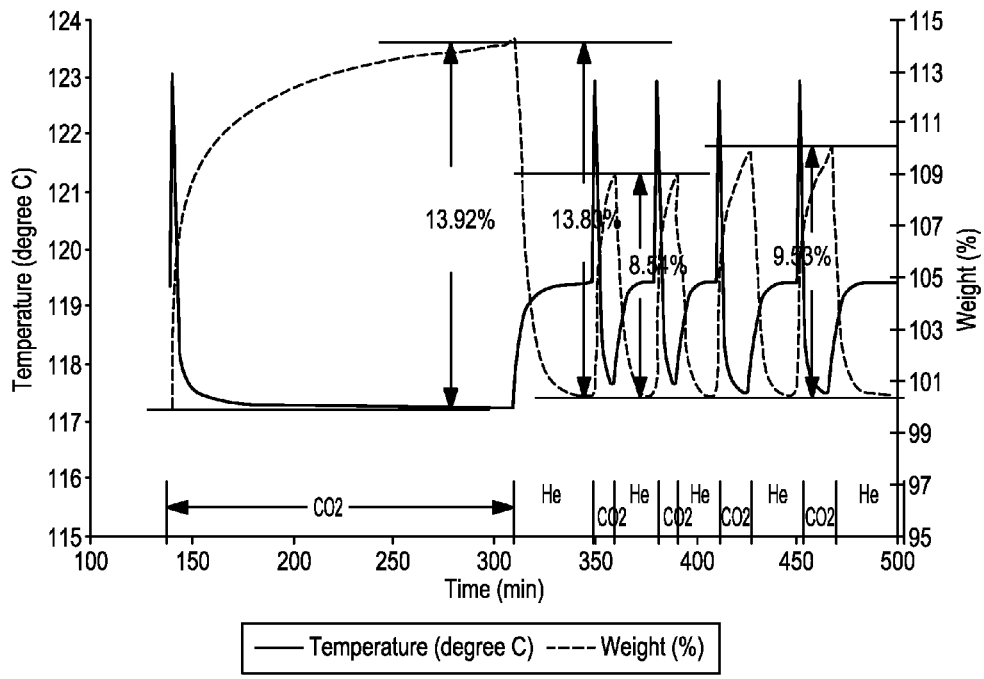
FIG. 2 shows $CO_2$ uptake as a function of time for a self-assembled siloxane formed according to a sequence similar to FIG. 1 during exposure to various gases.

The $CO_2$-induced self-assembly shown in FIG. 1 can produce a lamellar siloxane structure having a very high density of diamine moieties. Although the density of diamines can be relatively high, due to the tightly packed nature of the lamellar structure, the diffusion rate into and out of the structure can be somewhat slow. FIG. 2 shows an example of $CO_2$ sorption for a non-porous bulk solid produced via a process according to the scheme in FIG. 1. The solid line corresponds to the temperature over the course of the sorption study. The dotted line indicates the sample weight of the lamellar (siloxane) non-porous bulk solid throughout the experiment. The bars and arrows show the amount of change in weight due to $CO_2$ sorption (in wt %, relative to the weight of the bulk solid), as the introduced gas is varied between helium and $CO_2$. As shown in FIG. 2, exposing the lamellar non-porous bulk solid to $CO_2$ at a temperature of about 120° C. can result in uptake of more than ~13 wt % of $CO_2$, if the $CO_2$ exposure is continued for a sufficient period of time. This sorption can be almost completely reversible, as shown by release of ~13.8 wt % of $CO_2$, after uptake of ~13.9 wt %. However, for more reasonable cycle times for a $CO_2$ capture solid, such as a 20 second sorption time, the $CO_2$ uptake can be less than ~10 wt %.

Figure 3:
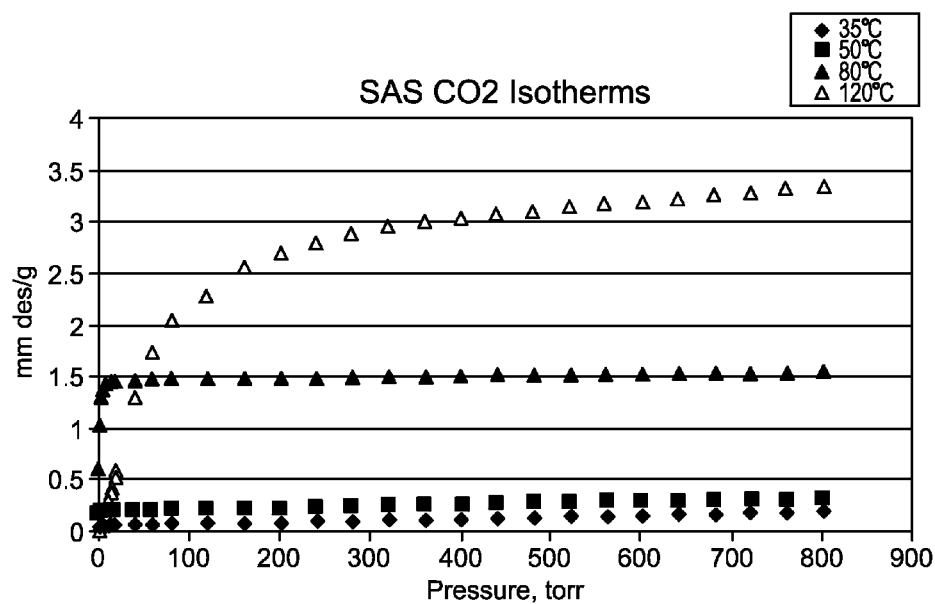
FIG. 3 shows $CO_2$ adsorption isotherms for a self-assembled siloxane formed according to a sequence similar to FIG. 1.

FIG. 3 can help provide further insight into the nature of the lamellar non-porous polysiloxane material formed according to the scheme in FIG. 1. FIG. 3 shows $CO_2$ sorption isotherms at various temperatures. Contrary to expectations, based on the rapid chemistry of amines with $CO_2$ at low temperatures, the data in FIG. 3 show a relatively large increase in $CO_2$ sorption capacity with, increasing temperature for the materials made according to the method shown in FIG. 1. As opposed to aqueous amine chemistry, where the gas adsorption is accomplished at ~35-40° C. and desorption is carried out at ~80-120° C., the data in FIG. 3 shows that the self-assembled polysiloxane sorbents generated according to the scheme in FIG. 1 can have substantial $CO_2$ uptake at temperatures where the commercial aqueous process undergoes rapid desorption. These results show that the energetics of $CO_2$ sorption and desorption may not accurately reflect the intrinsic kinetics of amine-$CO_2$ chemistry in these materials. Instead, without being bound by any particular theory, it is believed the $CO_2$ sorption and desorption properties can reflect severe mass transfer limitations for $CO_2$ diffusion into and out of these nonporous solids. Only at elevated temperatures do $CO_2$ diffusion rates appear to be high enough to generate relatively high observed gas uptake.

Variation 1—Reduced Crosslinking

The $CO_2$-induced self-assembly shown in FIG. 1 can produce a lamellar silica (polysiloxane) structure having a very high density of diamine moieties, such as the structure shown in FIG. 4. Although the density of diamines can be relatively high, the solid structure is believed to be relatively non-porous and tightly packed, resulting in unusual $CO_2$ sorption properties. Thus, while the self-assembly method shown in FIG. 1 can result in structures with relatively high amine content, structures with lower packing density and/or higher pore volume can be particularly desirable.

One option for altering the $CO_2$ sorption properties can be to use aminoalkyl-dialkoxyalkylsilane compounds. Having at least a portion of the amine-containing compounds correspond to dialkoxysilane compounds can result in formation of a more flexible siloxane network that can better accomodate diffusing gas molecules to/from the amine sorption sites.

Structure (1) shows an example of an amine-containing silane molecule with an alkyl group in place of one of the alkoxy groups.

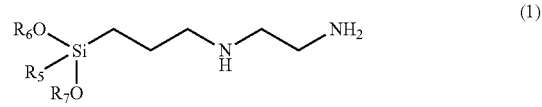

In structure (1), $R_5$ can be an alkyl group having 1 to 4 carbons, such as an ethyl or methyl group. To form a dialkoxysilane compound, R5 should be a non-alkoxy group, such as an alkyl group. Each of $R_6$ and $R_7$ can independently be chosen to be an alkyl group having 1 to 8 carbons, e.g., 6 or less carbons, including cyclic, unsaturated, saturated, and/or aromatic groups. Optionally but preferably, $R_6$ and $R_7$ can include the same number of carbons. Optionally, $R_5$ can include the same number of carbons as $R_6$ and/or $R_7$. It is noted that the alkyl portions of the aminoalkyl group can also have varying lengths, as described above. More generally, the aminoalkyl group can include one or more carbon chain portions and can include at least one amine, such as at least two amines.

Figure 5:
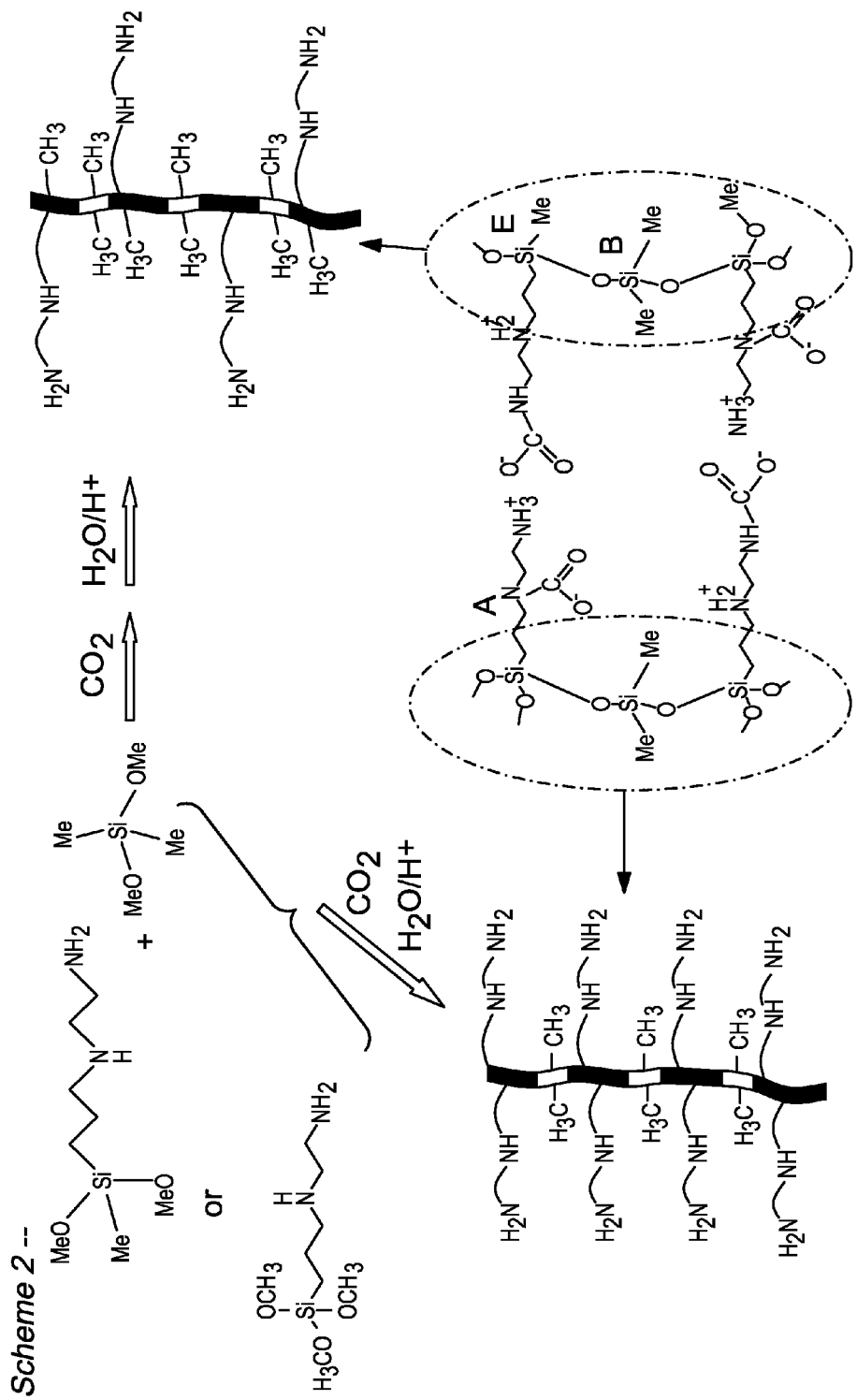
FIG. 5 schematically shows a reaction sequence for forming a variety of self-assembled siloxanes utilizing a spacer molecule and aminosiloxanes capable of forming a network structure having variable degrees of crosslinking.

By replacing one alkoxy group (of the three alkoxy groups of the crosslinking monomer) with an alkyl ($R_5$) group (to make a dialkoxy, or non-crosslinking, monomer), a siloxane structure with a reduced density of crosslinks can be formed. The reaction in FIG. 5 shows an example of two types of aminoalkoxysilane molecules that can be used for formation of a siloxane. The silane molecule shown in the middle left can correspond to the aminoalkyl-trialkoxysilane molecules described in FIG. 1. Self-assembly of this molecule in the presence of $CO_2$, followed by co-condensation in the presence of the dialkyldialkoxysilane spacer molecule can produce a structure such as illustrated in the bottom left and described herein. The polysiloxane backbone can, in some embodiments, correspond to a random mixture of the trialkoxysilane groups from the aminoalkyltrialkoxysilane reagent and the dialkoxysilane groups from the dialkoxydialkyl spacer molecule. All of the trialkoxysilanes can be reacted to form three silyl ether (S—O—Si) linkages to neighboring alkoxysilanes, as in FIG. 1. However, incorporation of the aminoalkyldialkoxysilane molecules can insert a siloxy monomer repeat unit in the backbone that is only capable of linear extension of the polymer structure (via only two silyl ether linkages). Thus, relative to the structure formed in FIG. 1 and shown in FIG. 4, insertion of the dialkoxysilane compounds can limit the silyl ether linkage density of the structure. The reduction of the silyl ether linkage density is believed to contribute to enhanced $CO_2$ diffusive access to, and reactivity with, the amine groups in the bulk solid.

In the limiting case, a structure can be formed to include only dialkoxy monomer units as illustrated on the right side of FIG. 5. Self-assembly of aminoalkyldialkoxyalkylsilane (structure 1 described above) in the presence of $CO_2$, followed by co-condensation in the presence of the dialkyldialkoxysilane spacer molecule, can produce a structure such as illustrated in the bottom right of FIG. 5. In this case, all of the Si atoms forming the siloxane polymer backbone can be limited to only two silyl ether linkages to neighboring alkoxysiloxanes, which can result only in a linear polymer chain (—Si—O— backbone repeats), e.g., having a random distribution of pendant diaminoalkyl sidechains. As opposed to the three-dimensionally crosslinked network structure of FIG. 4, the linear aminosiloxane polymer shown in the lower right of FIG. 5, is believed to yield greater amine accessibility and reactivity.

Using a mixture of trialkoxysilanes and dialkoxysilanes can allow for control of the desired crosslinking density for a self-assembled structure. Any convenient ratio of trialkoxysilanes and dialkoxysilanes can be used. In an embodiment, the self-assembled structure can include up to ~100% of dialkoxydisilane units. In other embodiments, the ratio of trialkoxysilanes to dialkoxysilanes can be about 5:1 or less, e.g., about 4:1 or less or about 1:1 or less (with a 0:1 ratio corresponding to 100% non-crosslinking dialkoxysilane repeat units). Additionally or alternately, in some embodiments where more than a modicum of crosslinking is desired, the ratio of trialkoxysilanes to dialkoxysilanes can be at least about 1:9, e.g., at least about 1:6, at least about 1:4, at least about 1:3, or at least about 1:2. Such partially crosslinked or un-crosslinked materials can be contrasted with the materials formed according to the scheme in FIG. 1, which contain only crosslinking (trialkoxysilane) monomer repeat units. In the discussion herein, the ratio of trialkoxysilane to dialkoxysilane compounds can be defined so that a silane compound with 4 alkoxy sidechains (a tetraalkoxysilane, such as tetraethoxysilane, or TEOS) is counted as a trialkoxysilane. In other words, the trialkoxysilane to dialkoxysilane ratio can be determined on the basis of compounds with 3 or more alkoxy groups, as opposed to compounds with exactly 3 alkoxy groups.

Variation 2—Spacer Compounds

Another option for modifying the properties of a self-assembled structure can be to include spacer compounds in the reaction mixture used for forming the self-assembled siloxane structure. Dialkoxydialkylsilane compounds (such as dimethyldimethoxysilane, as shown in A in FIG. 5) can be examples of compounds suitable for use as spacer compounds. Structure (2) shows the general structure for this type of spacer compound:

(2)

In structure (2), $R_1$, $R_2$, $R_3$, and $R_4$ can all be alkyl groups. $R_1$ and $R_2$ can preferably each be chosen to individually have 1 to 4 carbons, e.g., methyl or ethyl groups. $R_3$ and $R_4$ can each be independently chosen as an alkyl group having 1 to 8 carbons, e.g., 6 or less carbons, including cyclic, unsaturated, saturated, and/or aromatic groups. Optionally but preferably, $R_3$ and $R_4$ can include the same number of carbons. $R_1$, $R_2$, $R_3$, and $R_4$ can each be selected independently. Preferably, $R_1$ and $R_2$ can be the same, $R_3$ and $R_4$ can be the same, and/or all of $R_1$, $R_2$, $R_3$, and $R_4$ can be the same. For the spacer compound, at least two alkoxy groups (or other groups that can behave similarly during a condensation reaction) may be needed, so that the siloxane chain can continue to be propagated. A silane compound including only one alkoxy group (and thus three alkyl groups, for example) would act as a chain termination compound for the polysiloxane. Silane compounds with three or four alkoxy groups but not having an aminoalkyl group can be included in the reaction mixture, but such compounds are not considered spacer compounds, and could be broadly categorized as crosslinking monomers. Silane compounds lacking an aminoalkyl group but having three or more alkoxy groups (by virtue of the crosslinking increasing the density of the silyl ether linkages in the structure, decreasing the density of amine functionalities, and/or decreasing free volume for $CO_2$ sorption) can reduce and/or eliminate the benefit of using a spacer compound. As a result, although silane compounds with 3 or more alkoxy groups, and specifically no aminoalkyl group, can be used for fine-tuning the density of a self-assembled siloxane structure, such monomers/compounds can be excluded in some embodiments, as their use is generally not preferred for $CO_2$ sorption applications, The co-condensation of the dialkyldialkoxysilane with aminoalkyltrialkoxysilane compounds can serve to incorporate linear (backbone only) chain extension sites that can limit the crosslinking and/or crosslink density of the extended silyl ether (polysiloxane) network. Not only can this increase the spacing between amine-functional sites on the lamellar backbone, but it can also serve to limit particle growth and/or density. These structural changes in principle could serve to increase the accessibility of the amine-functional sites to sorbing gases (such as $CO_2$), as well as to decrease the diffusion path to the sorption sites, respectively. The structure in C of FIG. 5 shows an example of the impact of incorporating spacer compounds into a siloxane backbone structure.

It is noted that, during self-assembly of the siloxane compounds, the spacer compounds may not be aligned in the same manner as the aminoalkyl-alkoxysilane compounds. In the reaction scheme shown in FIG. 5, the alignment of the compounds prior to condensation can be based on carbamates formed by the amine groups. Since the spacer compounds lack amine functionality, the spacer compounds can remain unaligned (or approximately randomly oriented) prior to condensation. For the spacer compounds to be incorporated into the siloxane backbone structures, the spacer compounds can be present in a sufficient quantity so that a desired percentage of spacer compounds can be effectively incorporated into the siloxane polymer backbone, even though the spacer compounds may not strictly be aligned prior to the start of condensation. As a result, the spacer compounds may need to be present in an amount higher than would be indicated based purely on a desired concentration of spacers in the product siloxane compositions.

In the resulting siloxane product, the relative ratio of amine-containing groups to spacer groups can be based on a balance between a desired content of amines versus a desired porosity and/or density of the siloxane product. Preferably, the ratio of amine-functional groups to spacer groups can be at least about 2:3, e.g., at least about 1:1, at least about 3:2, or at least about 2:1. Additionally or alternately, if spacer groups are present, the ratio of amine-containing groups to spacer groups in the siloxane backbone can be about 5:1 or less, preferably about 4:1 or less. For self-assembled siloxane structures where spacer groups are the primary method for reducing the density, a ratio of about 5:1 or less can provide sufficient reduction in density to allow for improved $CO_2$ uptake kinetics.

Because the spacer compounds are not necessarily aligned prior to condensation of the siloxane product, the amount of spacer compounds in the reaction mixture can be larger. The ratio of amine-containing compounds to spacer compounds in the reaction mixture can be from about 4:1 to about 1:3, e.g., less than about 3:1, less than about 2:1, at least about 1:2, and/or at least about 2:3.

It is noted that the compound shown in C in FIG. 5 appears to have the structure of an alternating co-polymer. However, this structure is shown in this manner for convenience only, and it should be noted that the alternating co-polymer structure is not required (and may not be a highly likely repeat unit arrangement). Reaction conditions resulting in block co-polymer behavior relative to the amounts available compounds in the reaction mixture during condensation can be less desirable, but otherwise any type of (relatively) random arrangement of spacer groups and amine-functional groups can be acceptable in the siloxane polymer backbones. Thus, in some embodiments, the siloxane compounds can correspond to random co-polymers.

Variation 3—Pore Forming Additives

Figure 6:
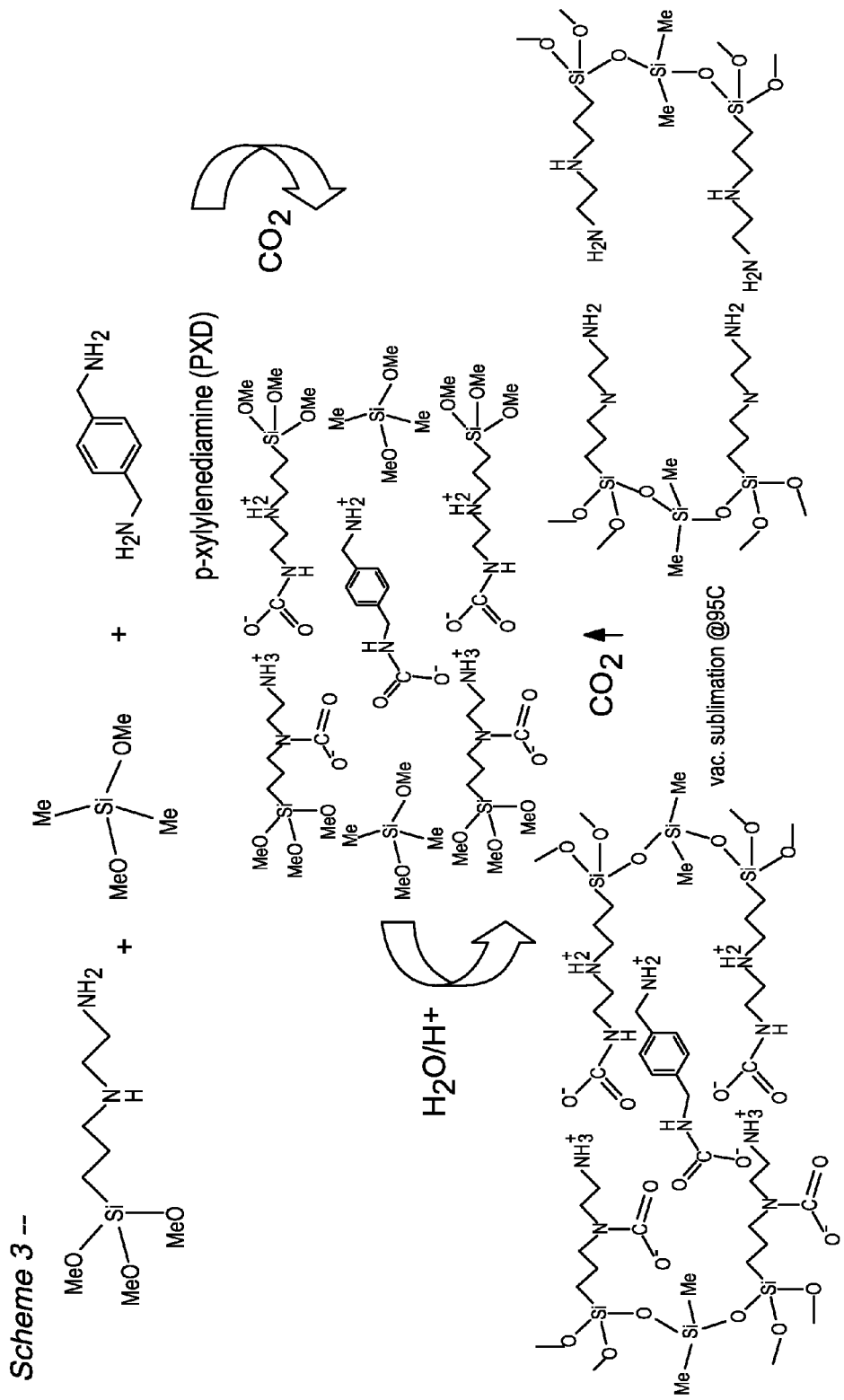
FIG. 6 schematically shows a reaction sequence for forming a variety of self-assembled siloxanes utilizing a pore forming reagent.

Yet another option, optionally in combination with one or more other options, for increasing the sorption kinetics of a self-assembled lamellar siloxane structure can be to incorporate pore-forming compounds into the reaction mixture for forming the siloxanes. FIG. 6 shows an example of a reaction sequence for incorporating a pore forming compound into the structure by way of creating molecular-sized pores or defects. This can be accomplished by adding a pore template (such as p-xylylenediamine, or PXD), which is capable of participating in the $CO_2$-induced self-assembly shown in FIG. 1, but which is lacking the alkoxysilane moieties to enable its connection with, (permanent incorporation into) the polysiloxane structure/lamellae. The PXD can form similar carbamate salts as amine-functional siloxanes and can assemble into the charge-balanced lamellar structure. However, due to the absence of a hydroxyl or alkoxy group (or two) attached to a silicon atom, the PXD is incapable of undergoing a condensation reaction with the other siloxanes and thus is incapable of being incorporated into the polymer backbone structure—the pore-forming compounds, therefore, cannot be considered monomers, even though they may contain amine functionalities that, may co-associate and/or co-align with similar amine-functional siloxane monomers, which are capable of being incorporated into a polymeric structure. Preferably, a spacer compound (such as dimethyldimethoxysilane) can be used in combination with the pore template to provide a surrogate siloxane to extend the polymer network to encapsulate where the pore template (e.g., the PXD, or PXD dicarbamate as sorbed) has inserted into the self-assembled structure.

After the condensation reaction to form the polysiloxane structure, including the carbamate salt of the pore-forming compound, the polysiloxane structure can be heated to remove and/or decompose the carbamate salts. This can result in formation of neutral amines and can evolve $CO_2$, e.g., as a gas. After conversion of the carbamates back into neutral amines, the neutral pore template compounds not covalently linked to the siloxane backbone can be easily removed, if desired, e.g., via solvent extraction or sublimation, as evidenced by high-resolution solid-state NMR of the product compositions. The space once occupied by each removed pore template can then be vacant, leaving voids (free volume) within the structure. If one imagines the lamellae as a ladder with diamine rungs, removal of the PXD template can result in a missing rung of the ladder.

The concept of introducing molecular-sized pores can be and has been extended to other pore templating molecules. For instance, materials have been successfully prepared using 4,4'-methylenebiscyclohexylamine as a pore template without its covalent inclusion into the final product, clearly suggesting that the concept of using other polyamine molecular pore templates can be a viable method for creating porosity that could be applied by those skilled in the art. More generally in this context, organic compounds including (at least) two amine groups, and which do not also contain an alkoxy- and/or hydroxy-functional silane, can be used as a pore-forming compound. Suitable compounds can include, but are not necessarily limited to, alkyl polyamines as well as polyamines including a ring structure. The polyamine compound can be saturated, unsaturated, and/or aromatic. For cyclic polyamines, the presence of a ring structure can be advantageous for providing increased rigidity (decreased flexibility) to a pore forming compound, which can be beneficial for formation of larger and/or more consistent pores for a given molecular weight for the pore-forming compound.

Without being bound by any particular theory, it is believed that the presence of a pore-forming compound can influence the structure of a self-assembled lamellar polysiloxane material in two separate manners. One impact can be that introducing a pore-forming material may enhance the ability of spacer compounds to be inserted into a polysiloxane chain. As described above, spacer compounds are compounds that lack an amine functionality, and therefore do not participate in self-assembly. If a pore-forming compound is not present, only minimal amounts of spacer compounds can be incorporated into the polysiloxane chain, e.g., when using an initial equimolar solution of amine-functional compounds and spacer compounds. In contrast, by adding a pore-forming compound to the same type of initial synthesis mixture, a ratio of amine-functional compounds to spacer compounds of about 1:2 or less can be achieved.

A potential second effect of a pore-forming compound can include a morphology change in the structure of the lamellar compounds. A lamellar compound formed according to the method of FIG. 1 can produce a highly irregularly-shaped, non-descript particle shape. By contrast, addition of a pore-forming compound can produce particles with a rod-shaped particle morphology. Without being bound by any particular theory, it is believed that the pore-forming compounds can participate in self-assembly, but the resulting carbamates of the pore-forming compounds could tend to phase separate into a separate crystalline phase dispersed within the less ordered lamellar phase of the self-assembled aminosiloxanes. Based on surface area measurements by nitrogen BET, it is further believed that the pore-forming compounds could have been acting as templating compounds for forming macropores instead of micropores.

Variation 4—Optional Additional Monomer Units

The aminoalkyl-alkoxysilane monomers described herein have included one silicon atom with multiple alkoxy moieties and at least one aminoalkyl moiety attached thereto. In some embodiments, compounds including two silicon atoms with alkoxy substituents can be used as additional and/or substitute crosslinking monomers. One example of a potential dual alkoxysilane compound can be $(MeO)_3Si(CH_2)_3NHCH_2CH_2NH(CH_2)_3Si(OMe)_3$. Other examples of potential dual alkoxysilane compounds can include, but are not limited to, $CH_3—(MeO)_2Si—[(CH_2)_3NH(CH_2)_2NH(CH_2)_3]—Si(OMe)_3$, $CH_3—(MeO)_2Si—[(CH_2)_3NH(CH_2)_2NH(CH_2)_3]—Si(OMe)_2—CH_3$, $H_2N(CH_2)_2NH(CH_2)_3—(MeO)_2Si—[(CH_2)_3NH(CH_2)_2NH(CH_2)_3]—Si(OMe)_3$, $H_2N(CH_2)_2NH(CH_2)_3—(MeO)_2Si—[(CH_2)_3NH(CH_2)_2NH(CH_2)_3]—Si(OMe)_2—CH_3$, and/or $H_2N(CH_2)_2NH(CH_2)_3—(MeO)_2Si—[(CH_2)_3NH(CH_2)_2NH(CH_2)_3]—Si(OMe)_2—(CH_2)_3NH(CH_2)_2NH_2$. It should be understood that, although methyl, methoxy, and bis(methyleneaminopropyl) moieties were utilized in the examples listed, those moieties can alternately be $C_1$-$C_4$ alkyl, $C_1$-$C_4$ alkoxy, and bis(alkyleneaminoalkyl) moieties, respectively. Based on the presence of two silicon atoms, such dual alkoxysilane compounds can participate as monomers in two different polysiloxane chains. In this way, this monomer can provides a spaced form of crosslinking whereby, as opposed to the siloxane monomers containing three or more alkoxy units capable of forming three or more tightly-bound silyl ether linkages in three dimensions, the dual alkoxysilanes can provide the opportunity of forming a crosslink between two polysiloxane chains spaced by an alkylamino segment linking the dual alkoxysilane units linked by silyl ether linkages to the backbones of two separate polysiloxane chains.

Composition of Polysiloxane Structures

In various embodiments, the polysiloxane structures formed from the various monomers can be described as a combination of monomers having two basic types of repeat unit structures. One basic repeat unit is a crosslinking monomer, while the other basic repeat unit is a non-crosslinking monomer, The non-crosslinking monomer can be represented generally as $—(—O—Si(R_1,R_2)—)_x$, where $R_1$ can be a $C_1$-$C_4$ alkyl moiety, preferably methyl or ethyl (e.g., methyl), and $R_2$ can be a $C_1$-$C_4$ alkyl moiety, preferably methyl or ethyl (e.g., methyl), or an aminoalkyl moiety comprising one or more amine groups (e.g., one to three amine groups) and up to 12 carbon atoms, preferably 8 carbon atoms or less or 4 carbon atoms or less per amine group. When $R_1$ and $R_2$ are both alkyl moieties, the non-crosslinking monomer can be an inert, spacer. When $R_1$ is an alkyl moiety and $R_2$ is an aminoalkyl moiety, the non-crosslinking monomer can be an amine-functional spacer. Non-crosslinking monomers can optionally, additionally or alternatively, include where $R_1$ and $R_2$ are both aminoalkyl moieties, which represents a diamine-functional spacer. As mentioned herein, although non-crosslinking monomers can include chain terminating compounds (where not only can both $R_1$ and $R_2$ be alkyl moieties but the bond that would otherwise be a silyl ether between repeat units (at the subscript "x") can also be a non-polymerizable moiety such as an alkyl moiety), such chain terminating compounds are not considered non-crosslinking monomers in the repeat unit structures described herein.

The crosslinking monomer can be represented generally as $—(—O—Si(R_3,R_4)—)_y$, where $R_3$ can be an aminoalkyl moiety comprising one or more amine groups and up to 12 carbon atoms, preferably 8 carbon atoms or less or 4 carbon atoms or less per amine group, and where $R_4$ can be an alkoxy moiety having 1 to 8 carbons, such as 6 or less carbons, including cyclic, unsaturated, saturated, and/or aromatic groups, or can be a silyl ether crosslink to another siloxane monomer. Alternatively, as mentioned above, $R_3$ can comprise an aminoalkyl moiety (spacer) bonded to a silicon atom that has at least two silyl ether bonds, such that it can function as an effective crosslink to another siloxane monomer/polymer chain. In such an alternative, $R_4$ can be as defined above, or $R_4$ can be a $C_1$-$C_4$ alkyl moiety (preferably a methyl group) or an aminoalkyl moiety fitting the description of $R_3$. It is noted that $R_4$ can be an alkoxy moiety having 1 to 8 carbons, which represents a precursor for crosslinking that has not yet participated in a condensation reaction to form a hydroxyl and then a silyl ether crosslink. However, monomers having such a moiety should be understood to be included within the definition of a "crosslinking" monomer, as they are indeed crosslinkable (hydrolyzable/condensable) under the appropriate conditions.

The ratio of crosslinking monomers to non-crosslinking monomers can be at least about 1:9, e.g., at least about 1:5 or at least about 1:2. Additionally or alternatively, the ratio of cross-linking monomers to non-cross-linking monomers can be about 5:1 or less, e.g., about 3:1 or less, about 2:1 or less, or about 1:1 or less.

Reagents for Forming Polysiloxanes

Formation of polysiloxanes comprising monomers (such as a combination of crosslinking monomers and non-crosslinking monomers) can be achieved by using appropriate reagents (e.g., corresponding to crosslinking repeat units and non-crosslinking repeat units). The non-crosslinking reagents/repeat units, optionally in combination with the crosslinking reagents/repeat units and/or a pore-forming agent, can be used to form polysiloxanes, e.g., via hydrolysis/condensation reaction(s).

The crosslinking reagent, when present, can correspond to a structure such as structure (3).

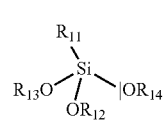

(3)

where $R_{11}$ is an aminoalkyl moiety comprising one to three amine groups and 12 carbon atoms or less, and $R_{12}$, $R_{13}$, and $R_{14}$ are each independently a $C_1$-$C_8$ alkyl moiety. Though other additional or alternative crosslinking agents are disclosed herein (e.g., where $R_{11}$ is an aminoalkyl moiety attached to a siloxane moiety having at least two, and as many as three, alkyoxy moieties attached thereto, in which case $OR_{12}$, as well as optionally one of the three corresponding alkoxy moieties on the siloxane portion of the aminoalkylsiloxane $R_{11}$, can alternatively be an aminoalkyl moiety or an alkyl moiety; where $R_{11}$ can be an alkoxy moiety similar to $R_{12}$, $R_{13}$, or $R_{14}$; or the like—this list was not necessarily meant to be exhaustive), this crosslinking agent represented in structure (3) can be present in most embodiments.

The non-crosslinking reagent can correspond to a structure such as structure (4).

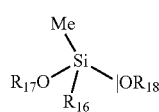

(4)

where $R_{15}$ is a $C_1$-$C_4$ alkyl moiety, $R_{16}$ is a $C_1$-$C_4$ alkyl moiety or an aminoalkyl moiety comprising one to three amine groups and up to 12 carbon atoms, and $R_{17}$ and $R_{18}$ are each independently a $C_1$-$C_8$ alkyl moiety.

$CO_2$ Sorption Properties for Self-Assembled Polysiloxanes

Figure 7A:
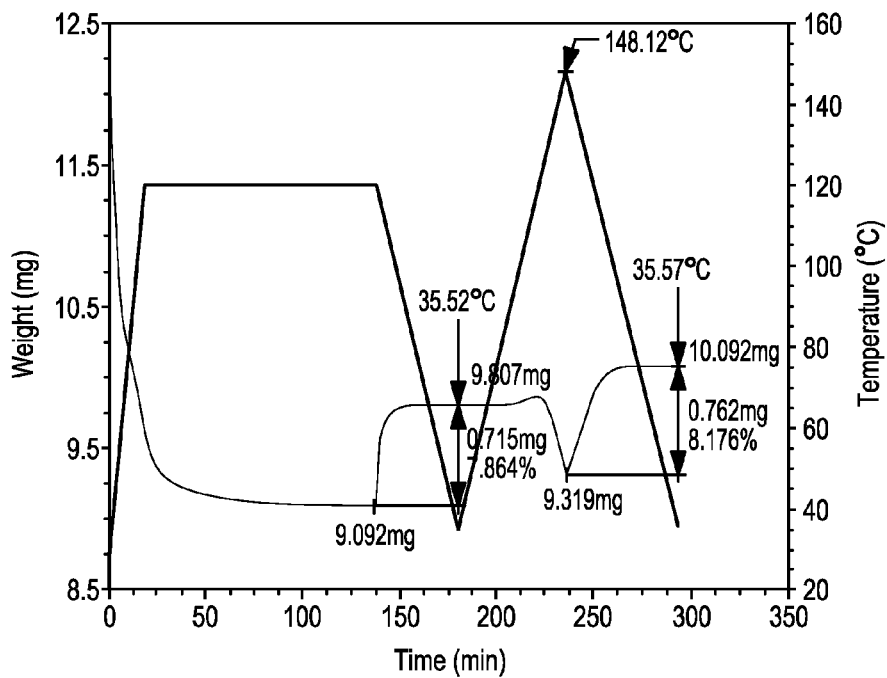
FIG. 7 shows examples of $CO_2$ uptake for self-assembled siloxanes prepared according to a) the procedure shown in FIG. 2, and b) the procedure shown in FIG. 5.
Figure 7B:
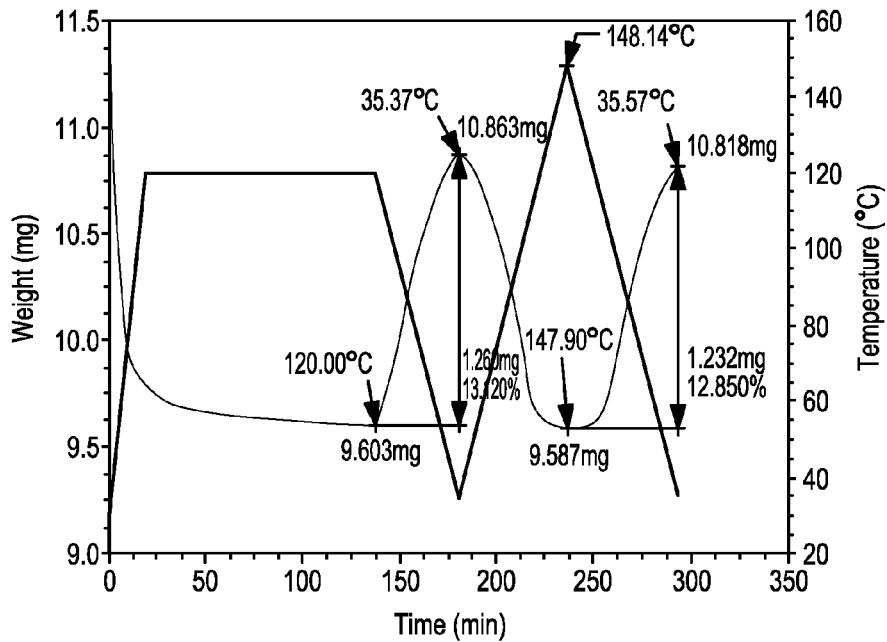

FIGS. 7a and 7b show gravimetric weight loss during pretreatment at ~120° C. in argon, and subsequent weight gain during $CO_2$ exposure at variable temperatures for a siloxane product prepared according to the FIG. 1 pathway (FIG. 7a), and a siloxane product prepared according to the FIG. 5 process (FIG. 7b).

In both FIGS. 7a and 7b, substantial initial weight loss was observed on ramping to and holding at ~120° C. in argon for about two hours, which was attributed to the loss of sorbed ambient water and/or $CO_2$. Upon switching the purge gas from argon to $CO_2$ at ~120° C., the FIG. 1 product was observed to exhibit an immediate weight gain of at least about 7 wt %, which appeared to quickly reach a plateau as the temperature was decreased in $CO_2$. By contrast, the sorbent prepared according to the scheme in FIG. 5 was observed to undergo very little weight gain on exposure to $CO_2$ at ~120° C., but appeared to readily gain weight on cooling, reaching a maximum of ~13 wt % at the lowest exposure temperature (~35° C.).

The behavior exhibited by the FIG. 5 product appeared to be much more in agreement with the well-known solution phase chemistry of amines with $CO_2$. For example, the FIG. 5 product appeared to show relatively rapid reaction at lower temperatures and equally rapid reversal of this chemistry at elevated temperatures. The observation of substantial $CO_2$ uptake only at elevated temperatures for the product prepared according to FIG. 1 appeared to clearly indicate that the gas sorption behavior of this material was not controlled by the intrinsic amine-$CO_2$ chemistry—without being bound by theory, it is believed that the gas sorption behavior for this material may be controlled by mass transfer resistance to $CO_2$ diffusion to the reactive amine sites.

Figure 8:
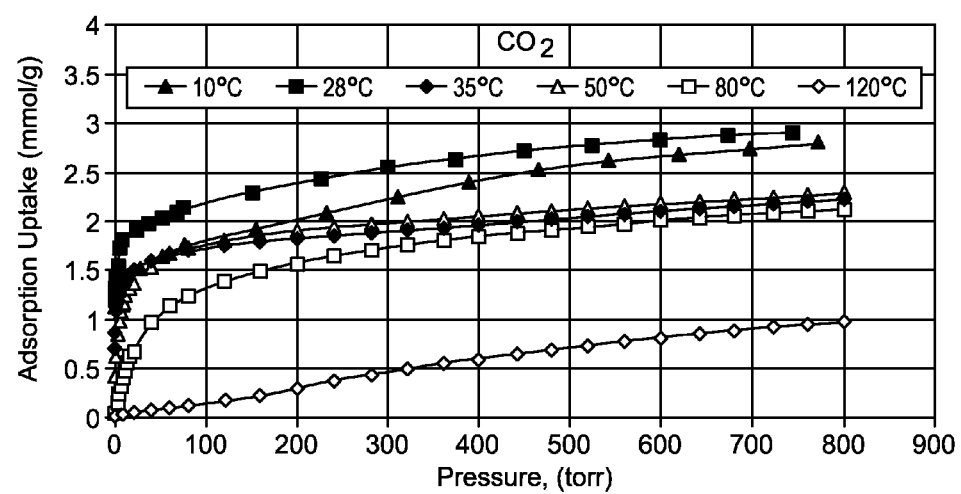
FIG. 8 shows $CO_2$ adsorption isotherms for a self-assembled siloxane formed according to a sequence similar to FIG. 5.

Further evidence for the above conclusion can be seen by comparison of the volumetric sorption isotherm of the FIG. 1 product (see FIG. 3) with that of the FIG. 5 product (see FIG. 8). Whereas the isotherms in FIG. 3 appear to show increasing uptake with increasing temperature, the isotherms in FIG. 8 appear to show the opposite trend with temperature, but these results appear to be in agreement with the gravimetric results in FIG. 7, appearing to indicate that the material prepared according to the prior art pathway in FIG. 1 may be mass transfer-limited, while the sorbent prepared according to the pathway in FIG. 5 may not be.

Figure 9:
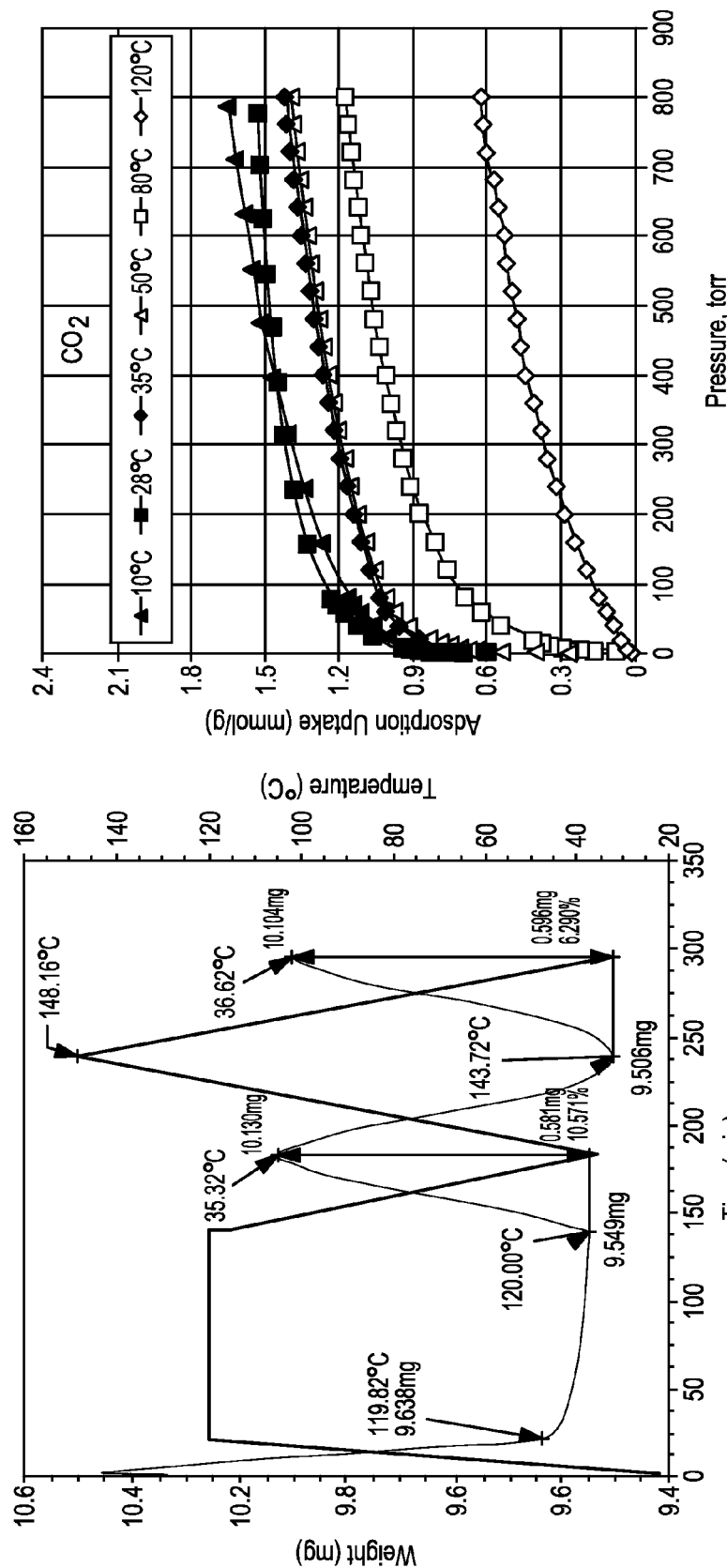
FIG. 9 shows $CO_2$ adsorption isotherms for a self-assembled siloxane formed according to a sequence similar to FIG. 6.

Some results obtained on materials prepared according to the FIG. 6 pore-templated self-assembly are given in FIG. 9. As seen with the FIG. 5 synthesis modification scheme, both gravimetric and volumetric measurements of $CO_2$ uptake shown in FIG. 9 appear to indicate increasing adsorption with decreasing temperature. Thus, both disclosed synthesis pathways appear to indicate substantial reductions in mass transfer resistance to $CO_2$ sorption, relative to the prior art material pathway. Reduced mass transfer resistance can translate to increased gas sorption and desorption rates in these materials, making them attractive for a solid amine based carbon capture process. The ability to desorb $CO_2$ at reduced temperatures can afford the potential for greatly reduced operating cost, e.g., by the convenient use of low grade waste heat for the sorbent regeneration in a temperature-swing adsorption process.

It is also noteworthy on the volumetric isotherms shown in FIGS. 8-9 that the materials formed according to the FIG. 5 or FIG. 6 scheme can exhibit relatively strong $CO_2$ uptake capacity at partial pressures below about 500 torr (about 60 kPa). This can be a beneficial property for a $CO_2$ capture sorbent in flue gas applications, where $CO_2$ partial pressures of about 60-160 torr (about 75-200 kPa) can be encountered. The steep sorption isotherms observed for these materials can indicate very effective low pressure sorption, and can specifically indicate the ability to sorb $CO_2$ down to very low concentrations.

Figure 10:
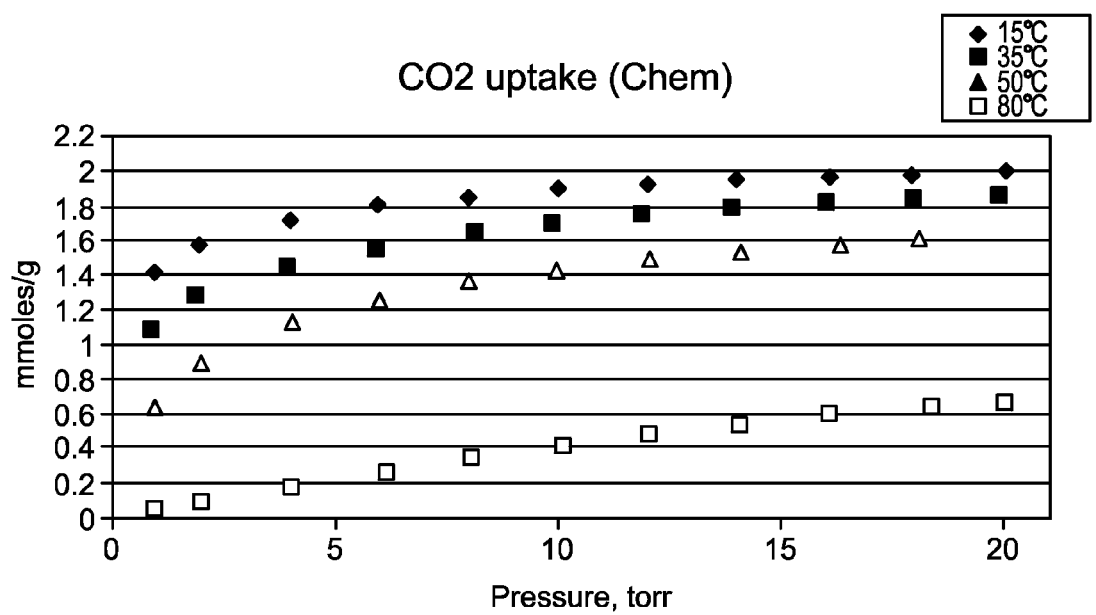
FIG. 10 shows $CO_2$ adsorption isotherms for a self-assembled siloxane formed according to a sequence that incorporates elements of the sequences in FIG. 5 and FIG. 6.

The synthetic pathways in FIGS. 5-6 to amine-functionalized polysiloxanes can yield a self-assembled siloxane material with unexpected performance improvements compared to materials synthesized according to FIG, 1. The schemes in FIGS. 5-6 can also be combined in a single synthesis. A material synthesized using both approaches was observed to produce a solid sorbent capable of sorbing at least about 1 mol $CO_2$/kg at $P_{CO2}$≈2 torr (250 Pa) at ~15° C., as shown in FIG. 10.

Exemplary Apparatus for Cyclic Adsorption

The self-assembled lamellar polysiloxane structures can be suitable for use in various types of separation systems, e.g., those that use solid adsorbents. This can include various types of swing adsorption vessels, such as vessels for pressure swing adsorption and/or temperature swing adsorption.

The lamellar structures described herein can be suitable for two types of swing adsorption. Structures formed according to the methods in FIGS. 5 and/or 6 can be used as a sorbent in swing adsorption processes where the $CO_2$ sorption step can be performed at relatively low temperatures, e.g., of about 25° C. to 40° C. For a structure formed according to FIG. 1, the slower kinetics typically limit the ability to use the structure as a primary sorbent at such low temperatures. However, the unexpected high temperature sorption behavior can allow the material formed according to FIG. 1 to be used for a trim adsorption at constant higher temperature, such as at ~120° C. In this type of configuration, the sorption and desorption can be driven by the relative presence or absence of $CO_2$ in a gas stream exposed to the adsorbent.

For a high temperature sorption process, a structure according to FIG. 1 can be exposed to a $CO_2$-containing gas stream at a temperature of at least about 85° C., e.g., at least about 90° C., at least about 100° C., or at least about 120° C.

This can result in sorption of $CO_2$ in the structure, as shown in FIGS. 2 and 3. After the exposure continues for a desired amount of time, at least a portion of the sorbed $CO_2$ can be desorbed by exposing the structure to a gas stream containing a lower content of $CO_2$, such as a gas stream containing about 0.5 wt % or less of $CO_2$, e.g., about 0.1 wt. % or less. The temperature during the exposing process for desorption can be different from the soiption temperature by about 10° C. or less, e.g., by about 5° C. or less.

For a swing adsorption process using a structure according to the methods in FIGS. 5 and/or 6, $CO_2$ can be sorbed from a $CO_2$-containing gas stream at a relatively low temperature, e.g., of about 25° C. to about 40° C. At least one of the temperature or the pressure can then be modified to desorb at least a portion of the sorbed $CO_2$. For a temperature swing process, the temperature can be increased to at least about 80° C., e.g., at least about 90° C. or at least about 100° C. For a pressure swing process, the structure can be exposed to a stream having a partial pressure of $CO_2$ less than 10% of the $CO_2$ partial pressure during the sorption step. In yet another swing adsorption process option, both temperature and pressure can be modified simultaneously according to the above specifications, to bring about rapid desorption.

Gas Stream

Gas streams particularly amenable to treatment by the present sorption processes can include, but are not necessarily limited to, flue gas from the combustion of carbonaceous fuels and natural gas from subterranean sources. Flue gas streams may originate, inter alia, from the combustion of carbon-containing fossil fuels such as natural gas, lignite coals, sub-bituminous coals, bituminous coals, and anthracite coals. Their $CO_2$ content may typically vary from about 3 vol % to about 15 vol %, depending on the fuel source, with the highest levels typically coming from hard coal combustion and the lowest from standard natural gas sources. Natural gas streams may typically contain, in addition to methane and carbon dioxide, one or more other gases such as ethane, propane, n-butane, isobutane, hydrogen, carbon monoxide, ethene, ethyne, propene, nitrogen, oxygen, helium, carbonyl sulfide, hydrogen sulfide, and the like, as well as, in some cases, metal contaminants such as mercury, if they have not been removed by other pre-treatments. Additional or alternative streams that can be treated by the present separation processes can include, but are also not limited to, syngas and shifted syngas produced in fuel gasification processes, gas streams produced in the manufacture of hydrogen, for example from methane steam reforming, and gas streams from refinery and petrochemical plants, whose compositions can naturally depend on the process(es) from which they were derived. Water is typically likely to be present both in flue gases and in natural gas from combustion of hydrocarbon fuels or from contact with ground waters. Although the present process can accept water in the entering gas stream, as described below, removal of substantial quantities of water and/or a goal of reducing water content to a certain threshold value, may be desirable, e.g., by treatment with a drying agent and/or by cooling to condense water and thereby to reduce the water content, so as to avoid an undesirable accumulation of water in the process.

The pressure of the gas stream can also vary, e.g., according to its origin; natural gas streams can typically be encountered at higher pressures than flue gas streams, and streams from refinery and petrochemical units can vary according to the processing conditions used in the unit. Flue gas streams can typically exhibit roughly atmospheric pressures, which can be as low as about 0.90 bara (about 90 kPaa) but the $CO_2$ partial pressure in the flue gas stream can typically range from about 0.03 bar (about 3 kPa) to about 0.15 bar (about 15 kPa) or from about 0.03 bar (about 3 kPa) to about 0.1 bar (about 10 kPa), with relatively large amounts of nitrogen from combustion air typically resulting in such relatively low $CO_2$ partial pressures in the stream (e.g. ~1 vol % $CO_2$ in $N_2$ or oxygen-depleted air in the total flue gas at ~1 bara (~100 kPaa) can result in a $CO_2$ partial pressure of ~0.01 bar (~1 kPa) in the flue gas; ~10 vol % $CO_2$ in $N_2$ or oxygen-depleted air in the total flue gas at ~1 bara (~100 kPaa) can result in a $CO_2$ partial pressure of ~0.1 bar (~10 kPa) in the flue gas; etc.). The partial pressure of the $CO_2$ in the sorption zone (tower inlet) can typically be at least ~0.025 bar (~2.5 kPa), and in most cases at least ~0.03 bar (~3 kPa).

Additional Embodiments

Additionally or alternatively, the present invention can include one or more of the following embodiments Embodiment 1. A polysiloxane composition comprising one or more crosslinking monomers and one or more non-crosslinking monomers, a molar ratio of crosslinking monomers to non-crosslinking monomers being about 5:1 or less, the crosslinking monomers having the structure —(—O—Si($R_3$,$R_4$)—)—, where $R_3$ is an aminoalkyl moiety comprising one or more amine groups and 12 carbon atoms or less, and where $R_4$ is an oxyalkyl moiety having 1 to 8 carbons or a silyl ether crosslink to another siloxane monomer, and the non-crosslinking monomers having the structure —(—O—Si($R_1$,$R_2$)—)—, where $R_1$ is a $C_1$-$C_4$ alkyl moiety, and where $R_2$ is independently a $C_1$-$C_4$ alkyl moiety or an aminoalkyl moiety comprising one or more amine groups and up to 12 carbon atoms, wherein, in at least a portion of the non-crosslinking monomers, $R_2$ is an aminoalkyl moiety comprising one or more amine groups and up to 12 carbon atoms.

Embodiment 2. A polysiloxane composition comprising one or more crosslinking monomers, one or more non-crosslinking monomers, and a pore-forming compound, a molar ratio of crosslinking monomers to non-crosslinking monomers being about 5:1 or less and a molar ratio of crosslinking monomers to pore-forming compound optionally being less than about 3:1, the crosslinking monomers having the structure —(—O—Si($R_3$,$R_4$)—)—, where $R_3$ is an aminoalkyl moiety comprising one to three amine groups and 12 carbon atoms or less, and where $R_4$ is an oxyalkyl moiety having 1 to 8 carbons or a silyl ether crosslink to another siloxane monomer, and the non-crosslinking monomers having the structure —(—O—Si($R_1$,$R_2$)—)—, where $R_1$ is a $C_1$-$C_4$ alkyl moiety, and where $R_2$ is independently a $C_1$-$C_4$ alkyl moiety or an aminoalkyl moiety comprising one to three amine groups and up to 12 carbon atoms, wherein the pore-forming compound comprises a diaminoalkyl compound, and wherein, in at least a portion of the non-crosslinking monomers, $R_2$ is a $C_1$-$C_4$ alkyl moiety.

Embodiment 3. A $CO_2$-sorbent polysiloxane composition comprising one or more crosslinking monomers and one or more non-crosslinking monomers, a molar ratio of crosslinking monomers to non-crosslinking monomers being about 5:1 or less, the crosslinking monomers having the structure —(—O—Si($R_3$,$R_4$)—)—, where $R_3$ is an aminoalkyl moiety comprising one or more amine groups and 12 carbon atoms or less, and where $R_4$ is an oxyalkyl moiety having 1 to 8 carbons or a silyl ether crosslink to another siloxane monomer, and the non-crosslinking monomers having the structure —(—O—Si($R_1$,$R_2$)—)—, where $R_1$ is a $C_1$-$C_4$ alkyl moiety, and where $R_2$ is independently a $C_1$-$C_4$ alkyl moiety or an aminoalkyl moiety comprising one to three amine groups and up to 12 carbon atoms, wherein, in at least a portion of the non-crosslinking monomers, $R_2$ is a $C_1$-$C_4$ alkyl moiety, and wherein the polysiloxane composition has a $CO_2$ sorption capacity of at least about 0.5 mmol of $CO_2$, e.g., at least about 1.5 mmol of $CO_2$, per gram polysiloxane composition at a temperature of about 50° C. or less and at a $CO_2$ partial pressure of at least about 50 kPa.

Embodiment 4. A polysiloxane composition comprising one or more crosslinking monomers and one or more non-crosslinking monomers, a molar ratio of crosslinking monomers to non-crosslinking monomers being about 5:1 or less, the crosslinking monomers having the structure —(—O—Si($R_3$,$R_4$)—)—, where $R_3$ is an aminoalkyl moiety comprising one to three amine groups and up to 12 carbon atoms and which is connected to a silicon atom of a siloxane monomer having either two or three $C_1$-$C_8$ alkoxy groups attached thereto, and where $R_4$ is a $C_1$-$C_4$ alkyl moiety, an oxyalkyl moiety having 1 to 8 carbons, including cyclic, unsaturated, saturated, or aromatic groups, or a silyl ether crosslink to another siloxane monomer, and the non-crosslinking monomers having the structure —(—O—Si($R_1$,$R_2$)—)—, where $R_1$ is a $C_1$-$C_4$ alkyl moiety, and where $R_2$ is independently a $C_1$-$C_4$ alkyl or an aminoalkyl moiety comprising one to three amine groups and up to 12 carbon atoms, wherein the aminoalkyl moiety of $R_3$ optionally has the formula —$CH_2(CH_2)_x NHCH_2(CH_2)_y CH_2 NHCH_2(CH_2)_z$—, where x is from 0 to 7, y is from 0 to 6, and z is from 0 to 7.

Embodiment 5. A polysiloxane composition comprising one or more non-crosslinking monomers, a pore-forming compound, and substantially no crosslinking monomers, a molar ratio of non-crosslinking monomers to pore-forming compounds being from about 1:9 to about 19:1, the pore-forming compound comprising a diaminoalkyl compound and/or a diamine-aromatic compound, and the non-crosslinking monomers having the structure —(—O—Si($R_1$, $R_2$)—)—, where $R_1$ is a $C_1$-$C_4$ alkyl moiety, and where $R_2$ is independently a $C_1$-$C_4$ alkyl moiety or an aminoalkyl moiety comprising one to three amine groups and up to 12 carbon atoms, wherein, in at least a portion of the non-crosslinking monomers, $R_2$ an aminoalkyl moiety comprising one or more amine groups and up to 12 carbon atoms.

Embodiment 6. The composition of any one of embodiments 1-2 and 4-5, wherein the composition has a $CO_2$ sorption capacity of at least about 0.5 mmol of $CO_2$, e.g., at least about 1.5 mmol of $CO_2$, per gram polysiloxane composition at a temperature of about 50° C. or less and at a $CO_2$ partial pressure of at least about 50 kPa.

Embodiment 7. The composition of any one of embodiments 1-3 and 5, wherein the aminoalkyl moiety has the formula —$CH_2(CH_2)_x NHCH_2(CH_2)_y CH_2 NH_2$, where x is from 0 to 7 and y is from 0 to 6.

Embodiment 8. The composition of any one of the previous embodiments, wherein $R_3$ is an aminoalkyl moiety comprising 8 carbon atoms or less, e.g., 4 carbon atoms or less, per amine group, wherein $R_4$ comprises at least one of a cyclic alkyl group, an unsaturated alkyl group, a saturated alkyl group, and an aromatic alkyl group, and/or wherein at least one of $R_1$ and $R_2$ is a methyl moiety.

Embodiment 9. The composition of any one of embodiments 1, 3-4, and 6-8, wherein the composition further comprises a non-polymerizing pore-forming compound comprising a diaminoalkyl compound and/or a diamino-aromatic compound, and wherein the pore-forming compound optionally comprises at least one ring.

Embodiment 10. The composition of any one of embodiments 1-4 and 6-9, wherein a molar ratio of crosslinking monomers to pore-forming compound is less than about 3:1

Embodiment 11. A method of making a polysiloxane composition comprising: forming a solution comprising one or more non-crosslinking reagents, optionally one or more crosslinking reagents, and optionally a pore-forming compound, a ratio of crosslinking reagents to non-crosslinking reagents being about 5:1 or less, the crosslinking reagents, when present, having the structure

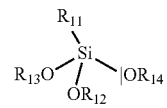

where $R_{11}$ is an aminoalkyl moiety comprising one to three amine groups and up to 12 carbon atoms, and each of $R_{12}$, $R_{13}$, and $R_{14}$ is independently an alkyl moiety having 1 to 8 carbons, the non-crosslinking reagents having the structure

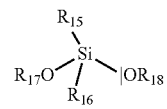

where $R_{15}$ is a $C_1$-$C_4$ alkyl moiety, $R_{16}$ is a $C_1$-$C_4$ alkyl moiety or an aminoalkyl moiety comprising one to three amine groups and up to 12 carbon atoms, and each of $R_{17}$ and $R_{18}$ is independently an alkyl moiety having 1 to 8 carbons, and the pore-forming compound, when present, comprising a diaminoalkyl compound and/or a diamine-aromatic compound, optionally comprising at least one ring; exposing the solution to a $CO_2$-containing gas stream under conditions sufficient for at least a portion of the amine groups to sorb $CO_2$ and thus form carbamates; adding water to the solution, the solution having a pH of 6 or less after addition of the water; and aging the solution to form a self-assembled and polymerized siloxane composition, the self-assembled and polymerized siloxane composition comprising a ratio of crosslinking monomers to non-crosslinking monomers of about 5:1 or less, wherein one or both of the following are satisfied: in at least a portion of the non-crosslinking reagents, $R_{16}$ is an aminoalkyl comprising one to three amine groups and up to 12 carbon atoms; and in at least a portion of the non-crosslinking reagents, $R_{16}$ is a $C_1$-$C_4$ alkyl moiety.

Embodiment 12. The method of Embodiment 11, further comprising heating the self-assembled polysiloxane composition to a temperature of at least about 80° C. to convert, at least a portion of the carbamates to amine groups.

Embodiment 13. The method of embodiment 11 or embodiment 12, further comprising, when a pore-forming compound is present in the forming step, treating the composition to substantially remove the pore-forming compound and/or $CO_2$ reaction products thereof.

Embodiment 14. A method for sorbing $CO_2$, comprising: exposing a $CO_2$-containing stream comprising a self-assembled amine-functionalized polysiloxane sorbent; sorbing at least about 1.5 mmol of $CO_2$ per gram of sorbent; and desorbing at least about 80% of the sorbed $CO_2$ at a temperature that differs from the exposure temperature by about 10° C. or less, at a pressure that is about 0-10% less than a pressure during the exposing, or a combination thereof.

Embodiment 15. The method of any one of embodiments 11-14, wherein the exposure temperature is at least about 80° C., wherein at least about 1.5 mmol of $CO_2$ is sorbed per gram of polysiloxane composition while maintaining a temperature that differs from the exposure temperature by less than about 10° C., and wherein the desorbing is at a temperature that differs from the exposure temperature by about 10° C. or less.

Embodiment 16. The method of any one of embodiments 11-15, wherein the self-assembled polysiloxane is a composition according to any one of embodiments 1-10.

EXAMPLES

Sorbent Materials Synthesis

In the following Examples, one or more of the following reagents were used to synthesize a self-assembled lamellar siloxane material. All preparations were done at a total reagent concentration of about 10 wt % in toluene solvent.

A: N-(2-aminoethyl)-3-aminopropyltrimethoxysilane, MW≈222.4 g/mol, BP≈140° C., d≈1.02 g/cm³, CAS #1760-24-3.

B: dimethyldimethoxysilane, MW≈120.2 g/mol, BP≈82° C., d≈0.87 g/cm³, CAS #1112-39-6.

C: p-xylenediamine, MW≈136.2 g/mol, BP≈230° C. (at ~10 mmHg, or ~1.3 kPag), MP≈60-63° C.

D: 4,4'-methylenebis(cyclohexylamine), MW≈210.4 g/mol, MP≈45° C., CAS #1761-71-3.

E: 2-aminoethylaminopropyl-methyldiethoxysilane, MW≈206.4 g/mol.

F: N,N'-Bis[3-(trimethoxysilyl)propyl]ethylenediamine.

Example 1

Synthesis According to Scheme in FIG. 1

First, about 11.1 grams (~0.05 mol) of reagent A was added into about 150 ml of anhydrous toluene, in a dried flask in a glovebox, stirring for a few minutes to homogenize, at which point the solution was transferred to a fume hood equipped with a $CO_2$ gas line. Then, $CO_2$ was bubbled into the solution with rapid stirring for about one hour (it was observed that the flask may warm, then cool down). About 4.5 grams of $H_2O$/HCl (pH ~1.5) was added dropwise into the flask at about room temperature (~20-25° C.), and the resulting mixture was stirred for about 3 days. The flask was then heated to about 90° C. to release $CO_2$, e.g., for about 5 hours, before the solvent was decanted. About 4.36 ml of ~3.3 mM NaOH and about 110 ml DI water were then added, and stirring was continued until a white suspension was formed. Water could then be removed, and the sample dried at about 90° C. under a modest vacuum.

Example 2

Synthesis Including Crosslinking Monomers, Spacers, and Pore Templates (Mol Ratio A:B:C ~1:2:1)

First, about 11.3 grams (~0.05 mol) of reagent A, about 12.0 g (~0.10 mol) of reagent B, and about 6.80 grams (~0.05 mol) of reagent C were added into about 270 ml of anhydrous toluene, in a dried flask in a glovebox. The mixture was stirred at about 60° C. for a few minutes, or until all the solid was visually observed to dissolve. Cooling was started on the solution, and $CO_2$ was bubbled into it, with rapid stirring for about one hour, until the flask was cooled down to about room temperature (~20-25° C.). About 6.3 grams of $H_2O$/HCl (pH ~1.5) was then added dropwise into the flask, and the resulting mixture was stirred at about room temperature (~20-25° C.) for about 3 days. The flask was then heated to about 90° C. to release $CO_2$, e.g., for about 5 hours, before the solvent was decanted. About 6.1 ml of ~3.3 mM NaOH and about 250 ml DI water were then added, and stirring was continued until a white suspension was formed. A solid sample was collected via centrifugation. The solid was purified by sublimation at a temperature of about 90-100° C. under a modest vacuum to remove any remaining/free reagent C.

Example 3

Synthesis Including Crosslinking Monomers, Spacers, and Alternate Pore Templates (Mol Ratio A:B:D ~1:2:1)

First, about 5.56 grams (~0.025 mol) of reagent A, about 6.01 grams (~0.05 mol) of reagent B, and about 5.26 grams (~0.025 mol) of reagent D were added into about 175 ml of anhydrous toluene, in a dried flask in a glovebox, stirring for a few minutes, or until all the solid was visually observed to dissolve. Then, $CO_2$ was bubbled into the solution with rapid stirring for about one hour until the mixture was cooled to about room temperature (~20-25° C.). About 3.15 grams of $H_2O$/HCl (pH ~1.5) was then added dropwise into the flask, and the resulting mixture was stirred at about room temperature (~20-25° C.) for about 3 days. The flask was then heated to about 95° C. to release $CO_2$, e.g., for about 6 hours, before the solvent was decanted. About 2 ml of ~0.05 M NaOH and about 100 ml DI water were then added, and stirring was continued at about room temperature (~20-25° C.) until a white suspension was formed. A solid sample was collected via centrifugation. The solid was purified by sublimation at a temperature of about 90-100° C. under a modest vacuum to remove any remaining/free reagent D.

Example 4

Synthesis Including Amine-Functional Non-Crosslinking Monomers and Spacers (Mol Ratio E:B ~1:1)

First, about 10.3 grams (~0.05 mol) of reagent E and about 6.01 grams (~0.05 mol) of reagent B were added into about 170 ml of anhydrous toluene, in a dried flask in a glovebox, stirring for a few minutes to homogenize. Then, $CO_2$ was bubbled into the solution with rapid stirring for about one hour until the mixture was cooled to about room temperature (~20-25° C.). About 4.50 grams of $H_2O$/HCl (pH ~1.5) was then added dropwise into the flask, and the resulting mixture was stirred at about room temperature (~20-25° C.) for about 5 days, after which the solvent was decanted off. About 2.84 ml of ~0.05 M NaOH and about 100 ml DI water were then added, and stirring was continued at about room temperature (~20-25° C.) until a white suspension was formed. Once the suspension was formed, the stirring was stopped, and quiescent conditions were maintained for about 3 days, at which point the top solution, which had separated, was decanted. The solid was dried overnight (~8-16 hours) at a temperature of about 90-100° C. under a modest vacuum.

Example 5

Synthesis Including Amine-Functional Non-Crosslinking Monomers, Spacers, and Pore Templates (Mol Ratio E:B:C ~1:2:1)

First, about 5.16 grams (~0.025 mol) of reagent E, about 6.01 grams (~0.05 mol) of reagent B, and about 3.41 grams (0.025 mol) of reagent C were added into about 152 ml of anhydrous toluene, in a dried flask in a glovebox. The mixture was stirred at about 60° C. for a few minutes, or until all the solid was visually observed to dissolve. Cooling was started on the solution, and $CO_2$ was bubbled into it, with rapid stirring for about one hour, until the flask was cooled down to about room temperature (~20-25° C.). About 2.70 grams of $H_2O/HCl$ (pH ~1.5) was then added dropwise into the flask, and the resulting mixture was stirred at about room temperature (~20-25° C.) for about 3 days. The flask was then heated to about 90° C. to release $CO_2$, e.g., for about 6 hours, after which a solid sample was collected via centrifugation. About 1.6 ml of ~0.05 M NaOH and about 150 ml DI water were added to the centrifuged solid, which was then stirred at about room temperature (~20-25° C.) until a white suspension was formed. The liquid portion of the suspension was decanted after another centrifugation step, at which point the resulting solid was washed with DI water, and centrifuged again. The water was then decanted off, and the resulting solid was then dried in an oven at about 105° C. to remove any visible water. The dried sample was purified by sublimation at a temperature of about 90-100° C. under a modest vacuum to remove any remaining/free reagent C.

The solid products of Examples 1-5 were analyzed by $^{13}C$ NMR using magic angle spinning (MAS) techniques to extrapolate relative composition based on the different reagents in the reaction mixture. For these Examples, relative molar contents of the relevant reagents/repeat units were normalized to an A monomer content of ~1.0, if A monomers were present, or to an E monomer content of ~1.0, if E monomers were present. The approximate results of those analyses are shown in Table 1 below.

TABLE 1

| Example # | Synthesis Composition | | | | | Product Composition (via NMR) | | | | |
|---|---|---|---|---|---|---|---|---|---|---|
| | A | B | C | D | E | A | B | C | D | E |
| 1 | 1 | 1 | | | | 1.0 | 0.1-0.2 | | | |
| 2 | 1 | 2 | 1 | | | 1.0 | 3.7 | —* | | |
| 3 | 1 | 2 | | 1 | | 1.0 | 2.8 | | —* | |
| 4 | 1 | | | 1 | | | 1.2 | | | 1.0 |
| 5 | | 2 | 1 | | 1 | | 1.3 | —* | | 1.0 |

Example 6

Synthesis Including Crosslinking Monomers, Amine-Functional Non-Crosslinking Monomers, and a Third Component (Mol Ratio A:E:F ~3:5:1)

First, about 4.00 grams of reagent A, about 6.18 grams of reagent E, and about 2.31 grams of reagent F were added into about 50 grams of anhydrous toluene, in a dried flask in a glovebox. The mixture was stirred at room temperature (about 20-25° C.) for a few minutes, or until all the solid was visually observed to dissolve to form a yellow solution. $CO_2$ was bubbled into the yellow solution, with rapid stirring for about one hour, at which point about 1.35 grams of $H_2O/HCl$ (pH ~1.5) was added dropwise into the flask, and the resulting mixture was stirred at about room temperature (~20-25° C.) for about 3 days. The flask was then heated to about 100° C. to release $CO_2$, e.g., for about 8 hours. Thereafter, the remaining toluene was decanted from the flask, followed by addition of about 5 ml of 25 wt % sodium methoxide in methanol and about 50 ml of methanol. This mixture was then stirred and sonicated for about 1 day at room temperature (~20-25° C.), after which a solid sample was collected via centrifugation. Methanol was added to wash the centrifuged solid, at which point the resulting mixture was centrifuged again. The twice-centrifuged solid was then dried in an oven at about 60° C. overnight (~8-16 hours) to remove any visible liquid, at which point the final dried solid was ground into a powder.

Figure 11A:
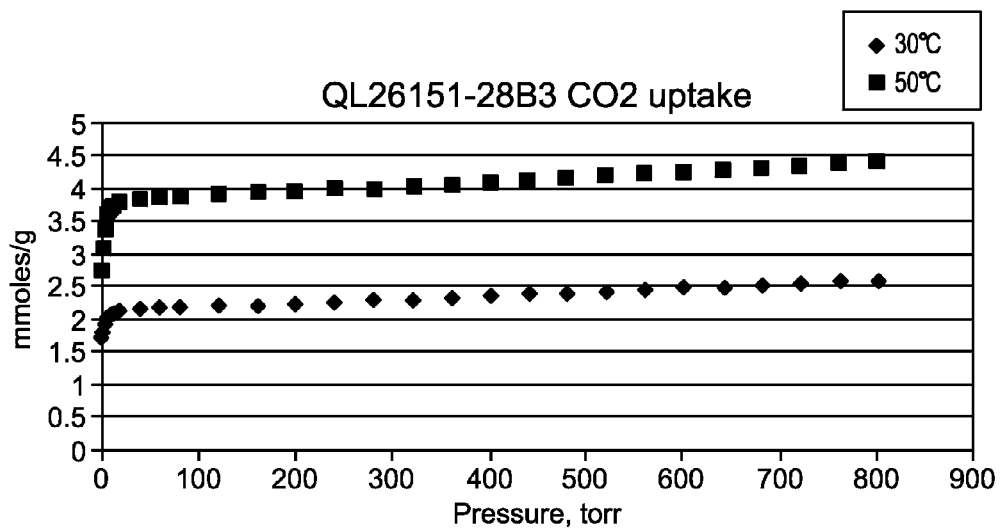
FIG. 11a shows a $CO_2$ adsorption isotherm for a self-assembled siloxane formed according to the invention.
Figure 11B:
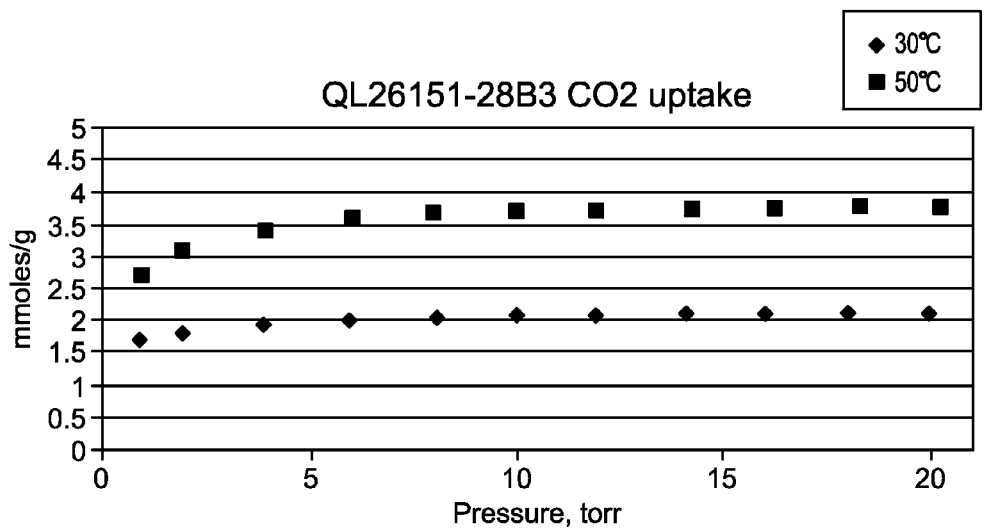

The powder sample of Example 6 was then tested for its $CO_2$ absorbance to yield the isotherm of FIG. 11a (and FIG. 11b) according to standard procedures.

Although the present invention has been described in terms of specific embodiments, it need not necessarily be so limited. Suitable alterations/modifications for operation under specific conditions should be apparent to those skilled in the art. It is therefore intended that the following claims be interpreted as covering all such alterations/modifications as fall within the true spirit/scope of the invention.

What is claimed is:

1. A polysiloxane composition comprising one or more crosslinking monomers and one or more non-crosslinking monomers, a molar ratio of crosslinking monomers to non-crosslinking monomers being about 5:1 or less, the crosslinking monomers having the structure

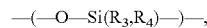

where $R_3$ is an aminoalkyl moiety comprising one or more amine groups and 12 carbon atoms or less, and where $R_4$ is an oxyalkyl moiety having 1 to 8 carbons or a silyl ether crosslink to another siloxane monomer, and the non-crosslinking monomers having the structure

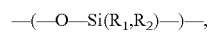

where $R_1$ is a $C_1$-$C_4$ alkyl moiety, and where $R_2$ is independently a $C_1$-$C_4$ alkyl moiety or an aminoalkyl moiety comprising one or more amine groups and up to 12 carbon atoms,
wherein, in at least a portion of the non-crosslinking monomers, $R_2$ is an aminoalkyl moiety comprising one or more amine groups and up to 12 carbon atoms.

2. The composition of claim 1, wherein the aminoalkyl moiety has the formula

where x is from 0 to 7 and y is from 0 to 6.

3. The composition of claim 1, wherein $R_3$ is an aminoalkyl moiety comprising 8 carbon atoms or less.

4. The composition of claim 1, wherein $R_3$ is an aminoalkyl moiety comprising 4 carbon atoms or less per amine group.

5. The composition of claim 1, wherein $R_4$ comprises at least one of a cyclic alkyl group, unsaturated alkyl group, saturated alkyl group, and aromatic alkyl group.

6. The composition of claim 1, wherein at least one of $R_1$ and $R_2$ is a methyl moiety.

7. The composition of claim 1, wherein the composition further comprises a non-polymerizing pore-forming compound comprising a diaminoalkyl compound, a diamino-aromatic compound, or a combination thereof.

8. The composition of claim 7, wherein the pore-forming compound comprises at least one ring.

9. A polysiloxane composition comprising one or more crosslinking monomers, one or more non-crosslinking monomers, and a pore-forming compound, a molar ratio of crosslinking monomers to non-crosslinking monomers being about 5:1 or less, the crosslinking monomers having the structure

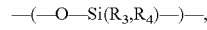

where $R_3$ is an aminoalkyl moiety comprising one to three amine groups and 12 carbon atoms or less, and where $R_4$ is an oxyalkyl moiety having 1 to 8 carbons or a silyl ether crosslink to another siloxane monomer, and the non-crosslinking monomers having the structure

where $R_1$ is a $C_1$-$C_4$ alkyl moiety, and where $R_2$ is independently a $C_1$-$C_4$ alkyl moiety or an aminoalkyl moiety comprising one to three amine groups and up to 12 carbon atoms,
wherein the pore-forming compound comprises a diaminoalkyl compound, and wherein, in at least a portion of the non-crosslinking monomers, $R_2$ is a $C_1$-$C_4$ alkyl moiety.

10. The composition of claim 9, wherein a molar ratio of crosslinking monomers to pore-forming compound is less than about 3:1.

11. A $CO_2$-sorbent polysiloxane composition comprising one or more crosslinking monomers and one or more non-crosslinking monomers, a molar ratio of crosslinking monomers to non-crosslinking monomers being about 5:1 or less, the crosslinking monomers having the structure

where $R_3$ is an aminoalkyl moiety comprising one or more amine groups and 12 carbon atoms or less, and where $R_4$ is an oxyalkyl moiety having 1 to 8 carbons or a silyl ether crosslink to another siloxane monomer, and the non-crosslinking monomers having the structure

where $R_1$ is a $C_1$-$C_4$ alkyl moiety, and where $R_2$ is independently a $C_1$-$C_4$ alkyl moiety or an aminoalkyl moiety comprising one to three amine groups and up to 12 carbon atoms,
wherein, in at least a portion of the non-crosslinking monomers, $R_2$ is a $C_1$-$C_4$ alkyl moiety, and wherein the polysiloxane composition has a $CO_2$ sorption capacity of at least about 0.5 mmol of $CO_2$ per gram polysiloxane composition at a temperature of about 50° C. or less and at a $CO_2$ partial pressure of at least about 50 kPa.

12. The composition of claim 11, wherein the composition has a $CO_2$ sorption capacity of at least about 1.5 mmol of $CO_2$ per gram of polysiloxane composition at a temperature of about 50° C. or less and at a $CO_2$ partial pressure of at least about 50 kPa.

13. A polysiloxane composition comprising one or more crosslinking monomers and one or more non-crosslinking monomers, a molar ratio of crosslinking monomers to non-crosslinking monomers being about 5:1 or less, the crosslinking monomers having the structure

where $R_3$ is an aminoalkyl moiety comprising one to three amine groups and up to 12 carbon atoms and which is connected to a silicon atom of a siloxane monomer having either two or three $C_1$-$C_8$ alkoxy groups attached thereto, and where $R_4$ is a $C_1$-$C_4$ alkyl moiety, an oxyalkyl moiety having 1 to 8 carbons, including cyclic, unsaturated, saturated, or aromatic groups, or a silyl ether crosslink to another siloxane monomer, and the non-crosslinking monomers having the structure

where $R_1$ is a $C_1$-$C_4$ alkyl moiety, and where $R_2$ is independently a $C_1$-$C_4$ alkyl or an aminoalkyl moiety comprising one to three amine groups and up to 12 carbon atoms.

14. A polysiloxane composition comprising one or more non-crosslinking monomers, a pore-forming compound, and substantially no crosslinking monomers, a molar ratio of non-crosslinking monomers to pore-forming compounds being from about 1:1 to about 19:1, the pore-forming compound comprising a diaminoalkyl compound and/or a diamine-aromatic compound, and the non-crosslinking monomers having the structure

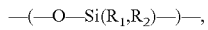

where $R_1$ is a $C_1$-$C_4$ alkyl moiety, and where $R_2$ is independently a $C_1$-$C_4$ alkyl moiety or an aminoalkyl moiety comprising one to three amine groups and up to 12 carbon atoms,
wherein, in at least a portion of the non-crosslinking monomers, $R_2$ an aminoalkyl moiety comprising one or more amine groups and up to 12 carbon atoms.

15. A method of making a polysiloxane composition comprising:
forming a solution comprising one or more crosslinking reagents and one or more non-crosslinking reagents, a molar ratio of crosslinking reagents to non-crosslinking reagents being about 5:1 or less, the crosslinking reagents having the structure

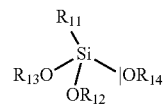

where $R_{11}$ is an aminoalkyl moiety comprising one to three amine groups and up to 12 carbon atoms, and each of $R_{12}$, $R_{13}$, and $R_{14}$ is independently an alkyl moiety having 1 to 8 carbons, and the non-crosslinking reagents having the structure

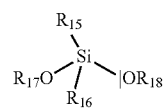

where $R_{15}$ is a $C_1$-$C_4$ alkyl moiety, $R_{16}$ is a $C_1$-$C_4$ alkyl moiety or an aminoalkyl moiety comprising one to three amine groups and up to 12 carbon atoms, and each of $R_{17}$ and $R_{18}$ is independently an alkyl moiety having 1 to 8 carbons, wherein, in at least a portion of the non-crosslinking reagents, $R_{16}$ is an aminoalkyl comprising one to three amine groups and up to 12 carbon atoms;

exposing the solution to a $CO_2$-containing gas stream under conditions sufficient for at least a portion of the amine groups to sorb $CO_2$ and thus form carbamates;

adding water to the solution, the solution having a pH of 6 or less after addition of the water; and aging the solution to form a self-assembled and polymerized siloxane composition, the self-assembled and polymerized siloxane composition comprising a molar ratio of crosslinking monomers to non-crosslinking monomers of about 5:1 or less.

16. The method of claim 15, further comprising heating the self-assembled polysiloxane composition to a temperature of at least about 80° C. to convert at least a portion of the carbamates to amine groups.

17. The method of claim 15, wherein the composition further comprises a pore-forming compound comprising a diaminoalkyl compound, a diamine aromatic compound, or a combination thereof.

18. A method of making a polysiloxane composition comprising:
forming a solution comprising one or more crosslinking reagents and one or more non-crosslinking reagents, a molar ratio of crosslinking reagents to non-crosslinking reagents being about 5:1 or less, the crosslinking reagents having the structure

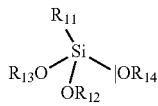

where $R_{11}$ is an aminoalkyl moiety comprising one to three amine groups and up to 12 carbon atoms, and each of $R_{12}$, $R_{13}$, and $R_{14}$ is independently an alkyl moiety having 1 to 8 carbons, and the non-crosslinking reagents having the structure

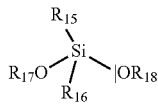

where $R_{15}$ is a $C_1$-$C_4$ alkyl moiety, $R_{16}$ is a $C_1$-$C_4$ alkyl moiety or an aminoalkyl moiety comprising one to three amine groups and up to 12 carbon atoms, and each of $R_{17}$ and $R_{18}$ is independently an alkyl moiety having 1 to 8 carbons, wherein, in at least a portion of the non-crosslinking reagents, $R_{16}$ is a $C_1$-$C_4$ alkyl moiety;

exposing the solution to a $CO_2$-containing gas stream under conditions sufficient for at least a portion of the amine groups to sorb $CO_2$ and thus form carbamates;

adding water to the solution, the solution having a pH of 6 or less after addition of the water; and aging the solution to form a self-assembled and polymerized siloxane composition, the self-assembled and polymerized siloxane composition comprising a molar ratio of crosslinking monomers to non-crosslinking monomers of about 5:1 or less.

19. The method of claim 18, wherein the exposure temperature is at least about 80° C., wherein the sorbing comprises sorbing at least about 1.5 mmol of $CO_2$ per gram of polysiloxane composition while maintaining a temperature that differs from the exposure temperature by less than about 10° C., and wherein the desorbing is at a temperature that differs from the exposure temperature by about 10° C. or less.

* * * * *